(12) United States Patent
Stanhope et al.

(10) Patent No.: US 11,117,079 B2
(45) Date of Patent: Sep. 14, 2021

(54) FILTER PACKS, PROCESSES FOR MAKING FILTER PACKS, AND AIR FILTERS COMPRISING FILTER PACKS

(71) Applicant: CHAMPION LABORATORIES, INC., Albion, IL (US)

(72) Inventors: Kent C. Stanhope, Albion, IL (US); John E. Simms, Albion, IL (US); Rodney K. Michels, Ellery, IL (US)

(73) Assignee: CHAMPION LABORATORIES, INC., Albion, IL (US)

( * ) Notice: Subject to any disclaimer, the term of this patent is extended or adjusted under 35 U.S.C. 154(b) by 168 days.

(21) Appl. No.: 15/875,551

(22) Filed: Jan. 19, 2018

(65) Prior Publication Data

US 2018/0207566 A1 Jul. 26, 2018

Related U.S. Application Data

(60) Provisional application No. 62/448,721, filed on Jan. 20, 2017.

(51) Int. Cl.
| | |
|---|---|
| *B01D 53/22* | (2006.01) |
| *B01D 46/00* | (2006.01) |
| *B01D 46/52* | (2006.01) |
| *B01D 35/30* | (2006.01) |
| *B60H 1/00* | (2006.01) |

(52) U.S. Cl.
CPC ....... *B01D 46/0002* (2013.01); *B01D 35/306* (2013.01); *B01D 46/521* (2013.01); *B01D 46/523* (2013.01); *B01D 2271/02* (2013.01); *B60H 2001/00635* (2013.01)

(58) Field of Classification Search
CPC ............. B01D 46/521; B01D 46/0002; B01D 35/306; B60H 2001/00635
See application file for complete search history.

(56) References Cited

U.S. PATENT DOCUMENTS

| | | | | |
|---|---|---|---|---|
| 4,646,703 A * | 3/1987 | Bradford | ............... | F02M 37/30 |
| | | | | 123/557 |
| 5,084,178 A * | 1/1992 | Miller | .................. | B01D 29/012 |
| | | | | 210/493.5 |
| 5,240,479 A * | 8/1993 | Bachinski | .............. | A62B 23/02 |
| | | | | 128/206.12 |
| 5,531,892 A * | 7/1996 | Duffy | .................... | B01D 29/232 |
| | | | | 210/493.1 |
| 5,804,014 A * | 9/1998 | Kahler | ................. | B01D 29/012 |
| | | | | 156/204 |
| 5,806,581 A * | 9/1998 | Haasch | .................. | B01D 35/18 |
| | | | | 165/76 |
| 6,349,693 B1 * | 2/2002 | Reinosa | ................. | B01D 27/00 |
| | | | | 123/196 A |
| 10,265,654 B2 * | 4/2019 | Shibuya | ............. | B01D 39/1623 |
| 2003/0021537 A1 * | 1/2003 | Qin | ...................... | G02B 6/4204 |
| | | | | 385/48 |

(Continued)

*Primary Examiner* — Anthony R Shumate
(74) *Attorney, Agent, or Firm* — Bryan Cave Leighton Paisner LLP

(57) ABSTRACT

An air filter includes a frame member and a deep-pleated media pack positioned within the frame member of the air filter. The frame member includes a gasket positioned around the perimeter of the frame member. The air filter is configured to permit air to enter from one end and pass through the filter media to a second end whereby particulate is removed from the airstream.

14 Claims, 31 Drawing Sheets

(56) References Cited

U.S. PATENT DOCUMENTS

| | | | |
|---|---|---|---|
| 2004/0079060 A1* | 4/2004 | Alward | C04B 35/6316 55/523 |
| 2004/0141835 A1* | 7/2004 | Katayama | B01D 46/125 415/121.2 |
| 2004/0168417 A1* | 9/2004 | Tanaka | B01D 39/1692 55/486 |
| 2005/0089772 A1* | 4/2005 | Kawaguchi | G02B 5/201 430/7 |
| 2005/0284116 A1* | 12/2005 | Duffy | B01D 46/521 55/497 |
| 2006/0081128 A1* | 4/2006 | Ball | B01J 20/28033 96/121 |
| 2006/0213278 A1* | 9/2006 | Arms | G01B 7/16 73/781 |
| 2008/0022643 A1* | 1/2008 | Fox | D04H 3/14 55/521 |
| 2008/0302074 A1* | 12/2008 | Gebert | B01D 39/1692 55/521 |
| 2010/0285293 A1* | 11/2010 | Lee | C09J 7/20 428/220 |
| 2012/0317944 A1* | 12/2012 | Lise | B01D 46/0001 55/499 |
| 2013/0048549 A1* | 2/2013 | Burrows | B01D 61/025 210/232 |
| 2013/0097982 A1* | 4/2013 | Inui | B01D 46/521 55/495 |
| 2013/0133517 A1* | 5/2013 | Gehwolf | C09J 167/02 95/285 |
| 2013/0341261 A1* | 12/2013 | Maki | B01D 35/30 210/234 |
| 2014/0130470 A1* | 5/2014 | Mori | B01D 71/36 55/497 |
| 2014/0137523 A1* | 5/2014 | Ikeda | B01D 46/10 55/418 |
| 2014/0223872 A1* | 8/2014 | Bao | B01D 39/16 55/486 |
| 2014/0250846 A1* | 9/2014 | Walls | A62B 18/084 55/500 |
| 2014/0303272 A1* | 10/2014 | Zhang | C09J 171/00 522/8 |
| 2014/0360147 A1* | 12/2014 | Polizzi | B01D 46/521 55/500 |
| 2015/0211451 A1* | 7/2015 | Ishii | F02M 35/0245 55/385.3 |
| 2016/0067647 A1* | 3/2016 | Tate | B01D 46/10 95/273 |
| 2016/0297285 A1* | 10/2016 | Luley | B01D 46/125 |
| 2017/0028338 A1* | 2/2017 | Xin | B01D 46/0001 |
| 2017/0065923 A1* | 3/2017 | Fox | B01D 39/083 |
| 2017/0348626 A1* | 12/2017 | Sakano | B01D 46/0001 |
| 2018/0264392 A1* | 9/2018 | Niki | B01D 46/0005 |
| 2019/0168148 A1* | 6/2019 | Dirnberger | B01D 46/521 |
| 2020/0230536 A1* | 7/2020 | Horie | B01D 46/0072 |

* cited by examiner

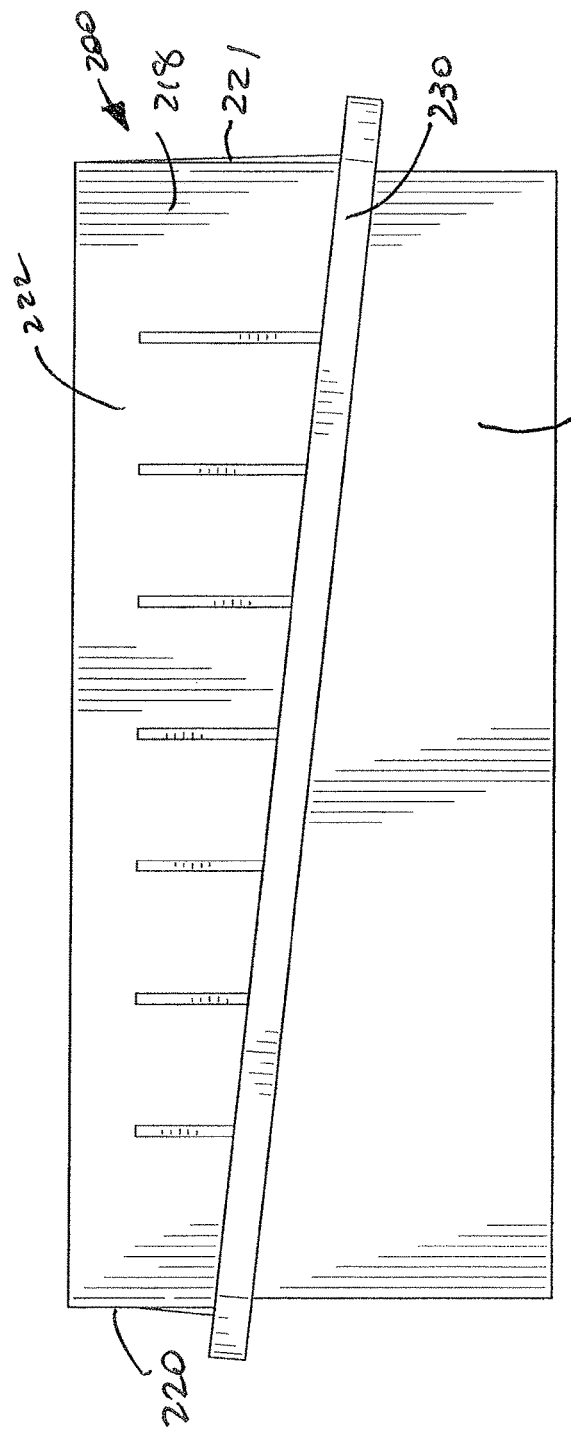
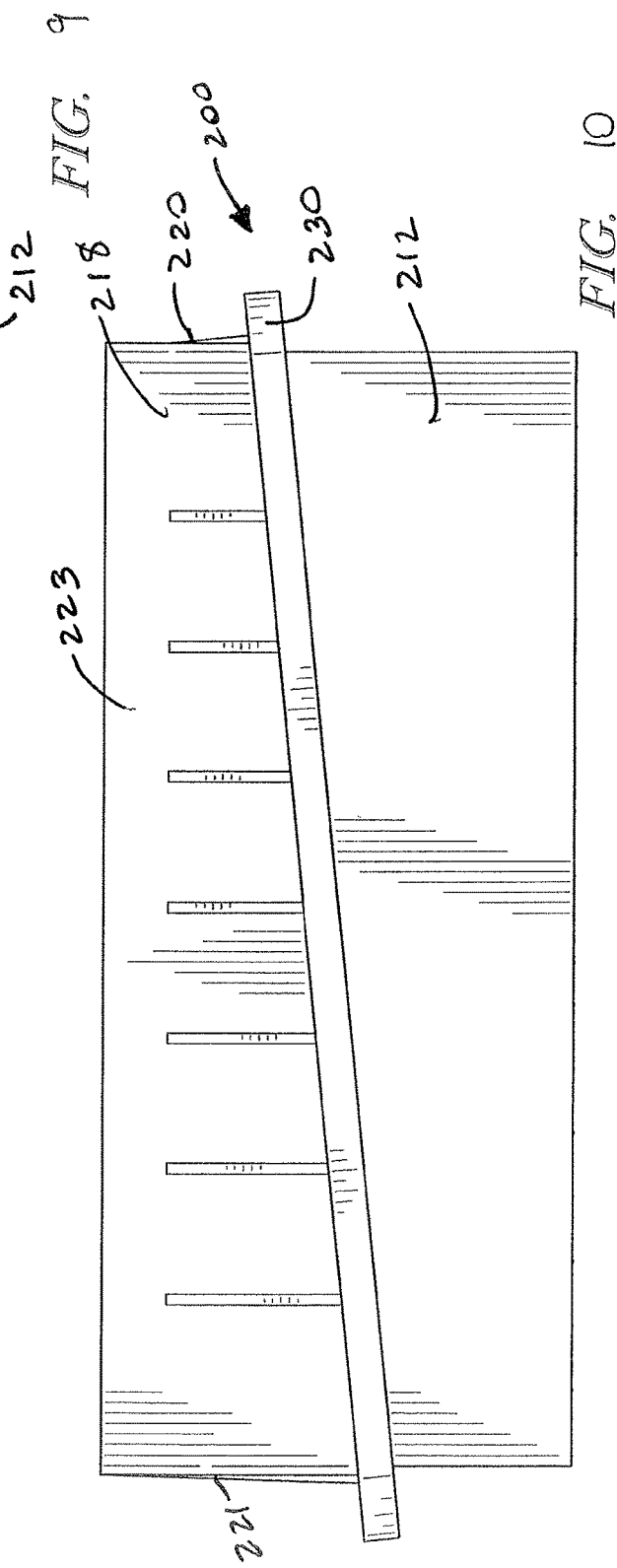
FIG. 9
FIG. 10

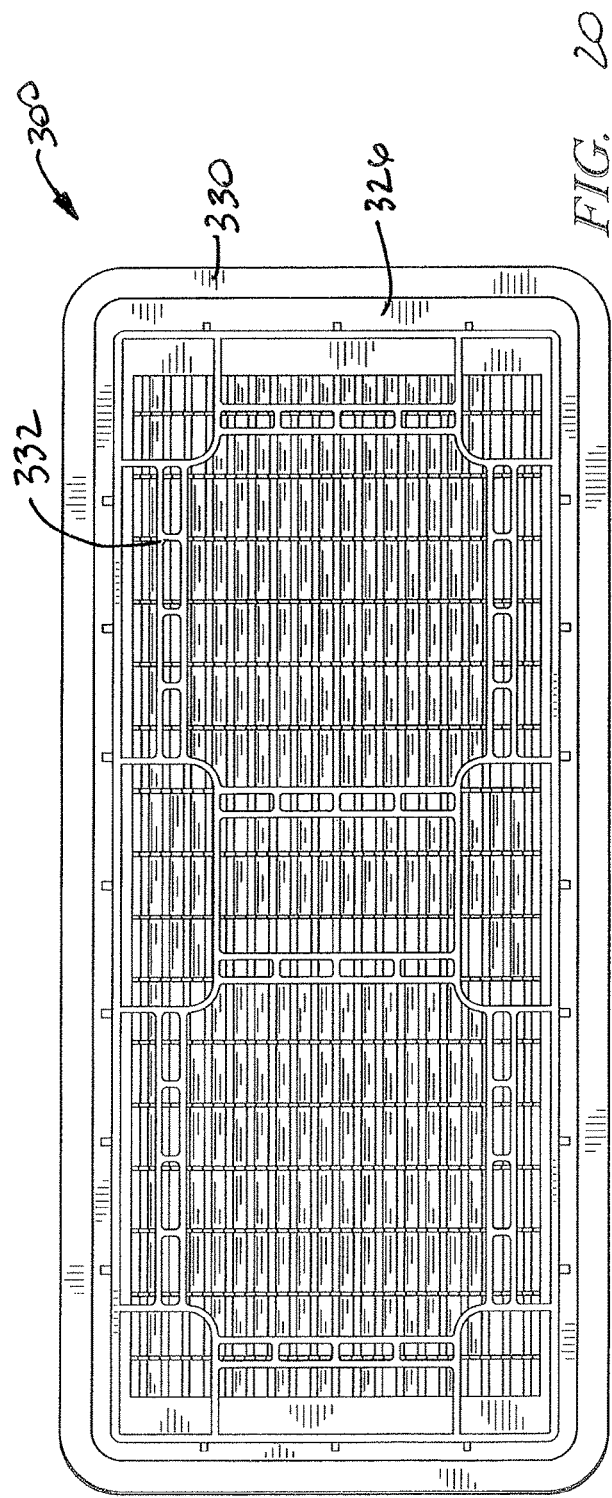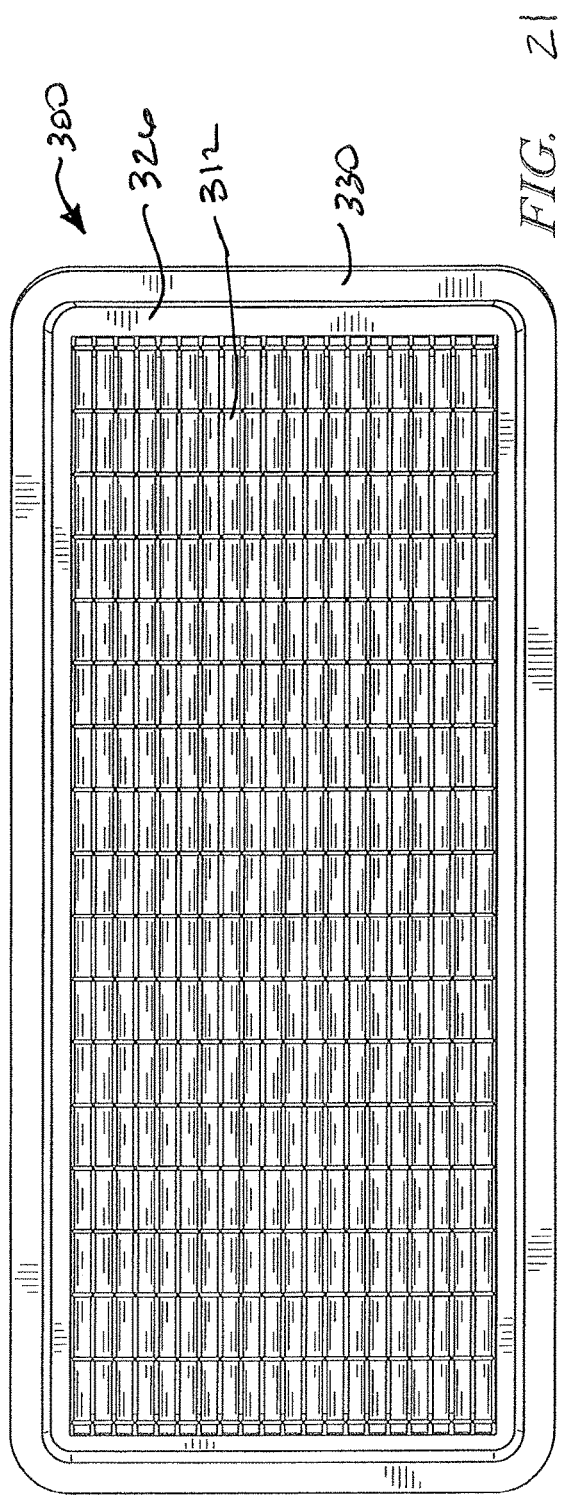
FIG. 20
FIG. 21

FILTER PACKS, PROCESSES FOR MAKING FILTER PACKS, AND AIR FILTERS COMPRISING FILTER PACKS

RELATED APPLICATIONS

This application claims the benefit of U.S. Provisional Application No. 62/448,721, filed Jan. 20, 2017. The entire contents of the provisional application are incorporated herein by reference, except that in the event of any inconsistent disclosure or definition from the present specification, the disclosure or definition herein shall be deemed to prevail.

TECHNICAL FIELD

The present teachings relate generally to filters and, in some embodiments, to air filters. In some embodiments, the present teachings relate to air filters for use in motor vehicles.

BACKGROUND

Filter packs with a capacity to remove particulate matter from a stream may be useful in a variety of applications including but not limited to applications in the automotive industry.

SUMMARY

The scope of the present invention is defined solely by the appended claims, and is not affected to any degree by the statements within this summary.

According to the present teachings, an air filter includes a frame member, a filter pack positioned within the frame member and a seal member surrounding the frame member.

In illustrative embodiments, the filter includes an injected molded plastic frame that includes a continuous side wall. The side wall, in some embodiments, includes an outwardly extending flange. The flange extends around the perimeter of the plastic frame. An elastomeric material (e.g., urethane) is overmolded or adhered onto the flange to form a gasket around the perimeter of the frame. The frame may include a series of structural braces that extend across the top opening of the frame. The structural braces are interconnected to the side walls and provide rigidity to the structure.

In illustrative embodiments, the air filter includes a deep-pleated filter pack that is formed to include an overall cubic shape, rectangular shape, oval shape, or circular shape. The filter pack is positioned within the plastic frame. The filter pack is secured to the frame with an adhesive. Due to the deep draw of the filter pack, the filter pack may extend down past the bottom of the plastic frame.

In illustrative embodiments, the pleats of the filter pack are separated by a series of pleat separators. The pleat separators are identically aligned back-to-back on each side of the pleats. The pleat separators are formed from a material that is viscous enough for the pleats to be folded together without closing the spacing between the pleats.

Additional features of the present teachings will become apparent to those skilled in the art upon consideration of illustrative embodiments exemplifying the best mode of carrying out the present teachings as presently perceived.

BRIEF DESCRIPTION OF THE DRAWINGS

The detailed description particularly refers to the accompanying figures in which:

FIG. 9 is a side view of the air filter of FIG. 8;
FIG. 10 is another side view of the air filter of FIG. 8.

FIG. 20 is a top view of the air filter of FIG. 15;
FIG. 21 is a bottom view of the air filter of FIG. 15;

DETAILED DESCRIPTION

Filter packs with the capacity for high airflow rates as well as a significant degree of particulate capture have been discovered and are described herein. Filter packs in accordance with the present teachings may be used in air filters, including but not limited to air filters configured to be received in air filter housings, such as those found in motor vehicle applications. Filter packs in accordance with the present teachings are referred to herein as "deep-pleated" or "deep draw" because the filter packs are characterized by having a large ratio of pleat depth (i.e., the vertical distance between opposing folded edges) to face-to-face spacing between adjacent pleat faces. In some embodiments, as further described below, this ratio is at least about 25.

It is to be understood that elements and features of the various representative embodiments described below may be combined in different ways to produce new embodiments that likewise fall within the scope of the present teachings.

Figure 1:
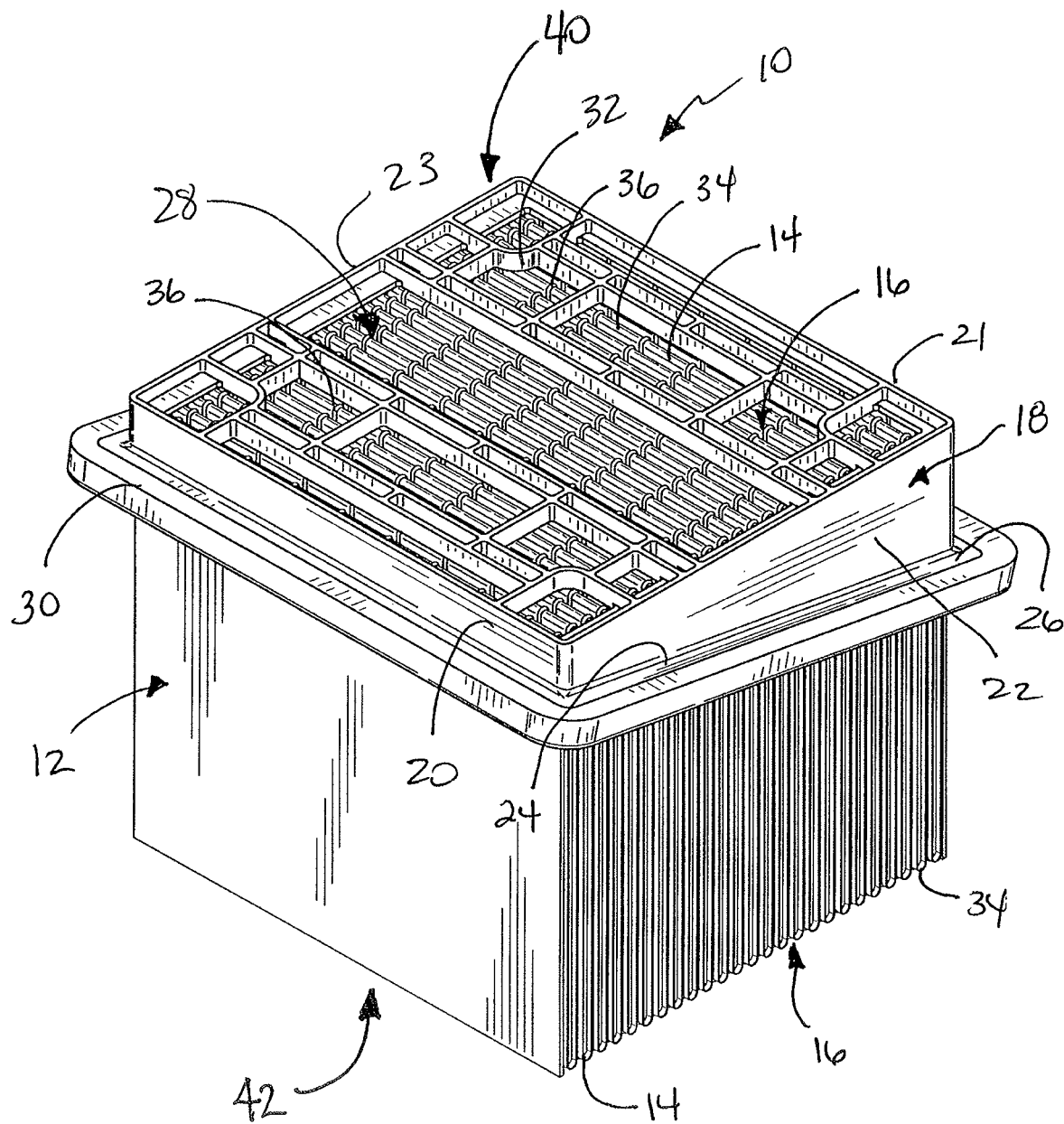
FIG. 1 is a perspective view of a first embodiment of an air filter showing a frame member, a deep-pleated filter pack, a portion of which is positioned within the frame member, and a gasket extending around the perimeter of the frame member, the pleat pack formed from a series of vertical pleats.
Figure 2:
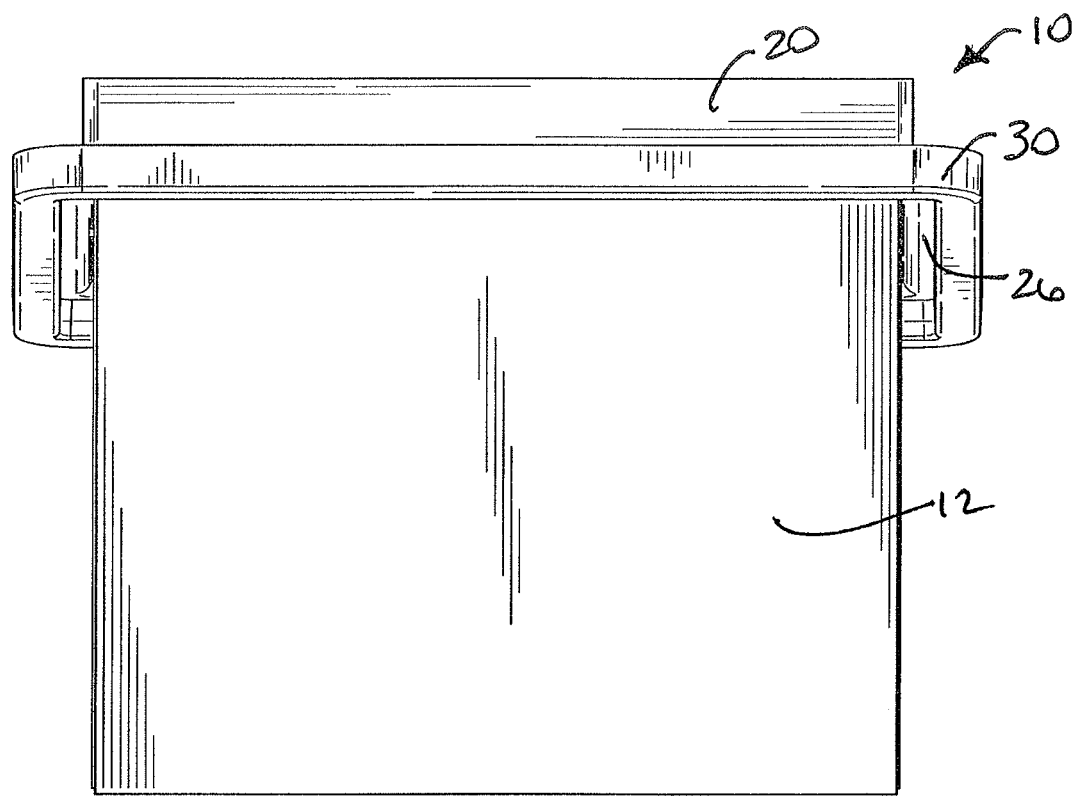
FIG. 2 is a front view of the air filter of FIG. 1.
Figure 3:
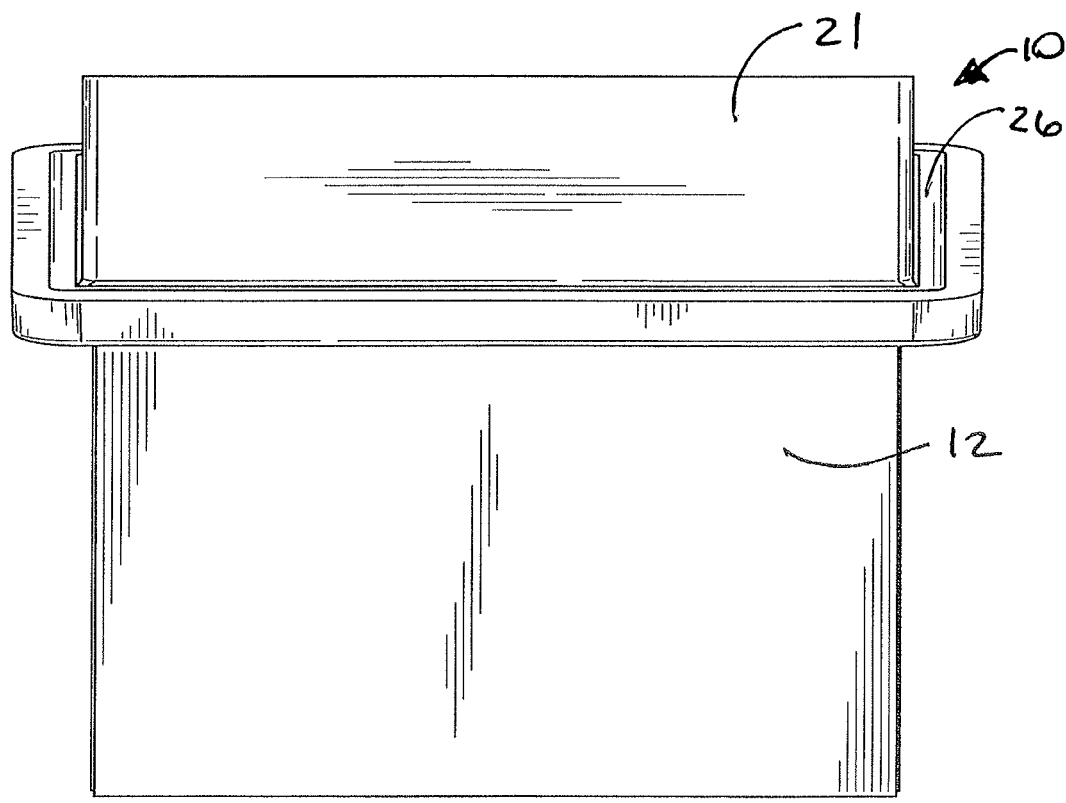
FIG. 3 is a rear view of the air filter of FIG. 1.
Figure 4:
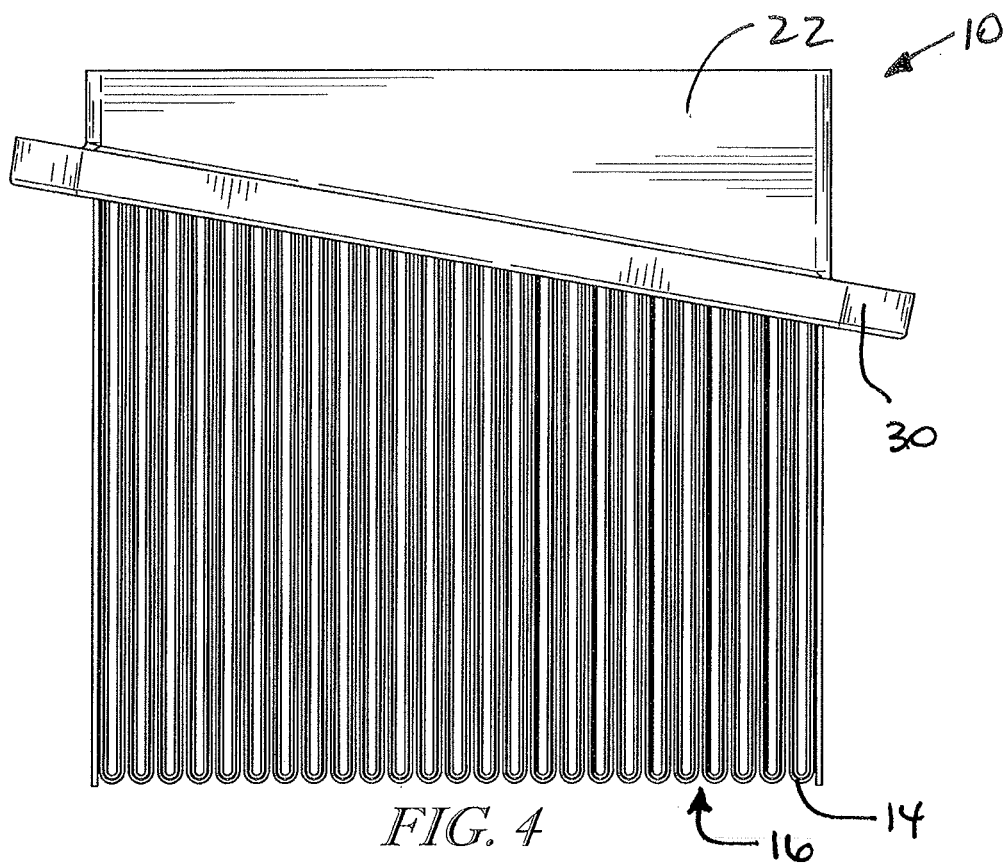
FIG. 4 is a side view of the air filter of FIG. 1.
Figure 5:
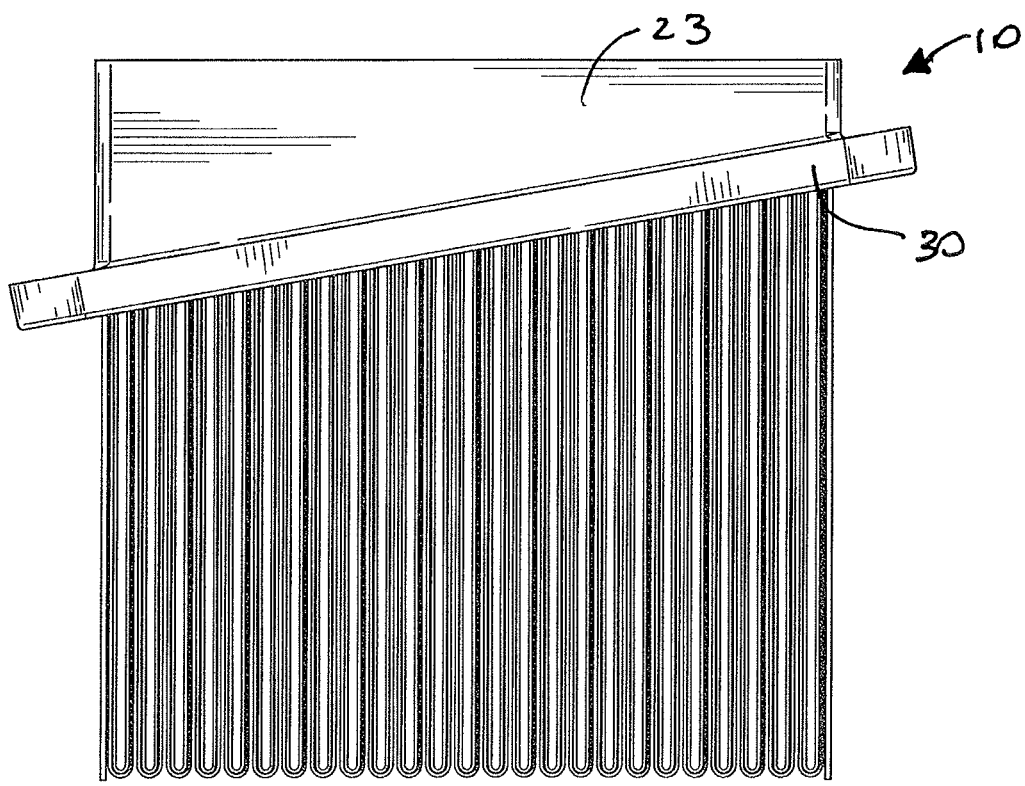
FIG. 5 is another side view of the air filter of FIG. 1.
Figure 6:
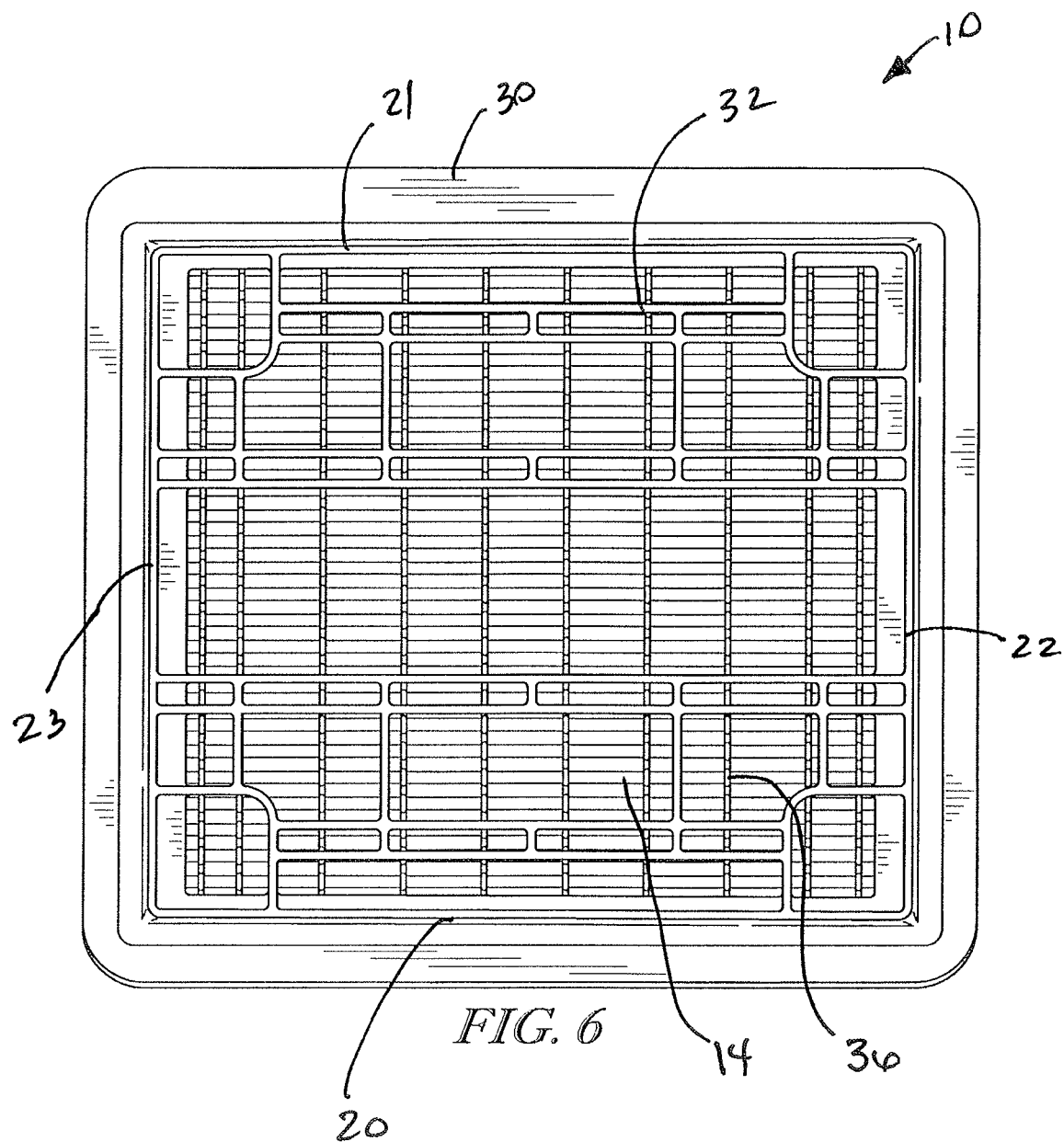
FIG. 6 is a top view of the air filter of FIG. 1.
Figure 7:
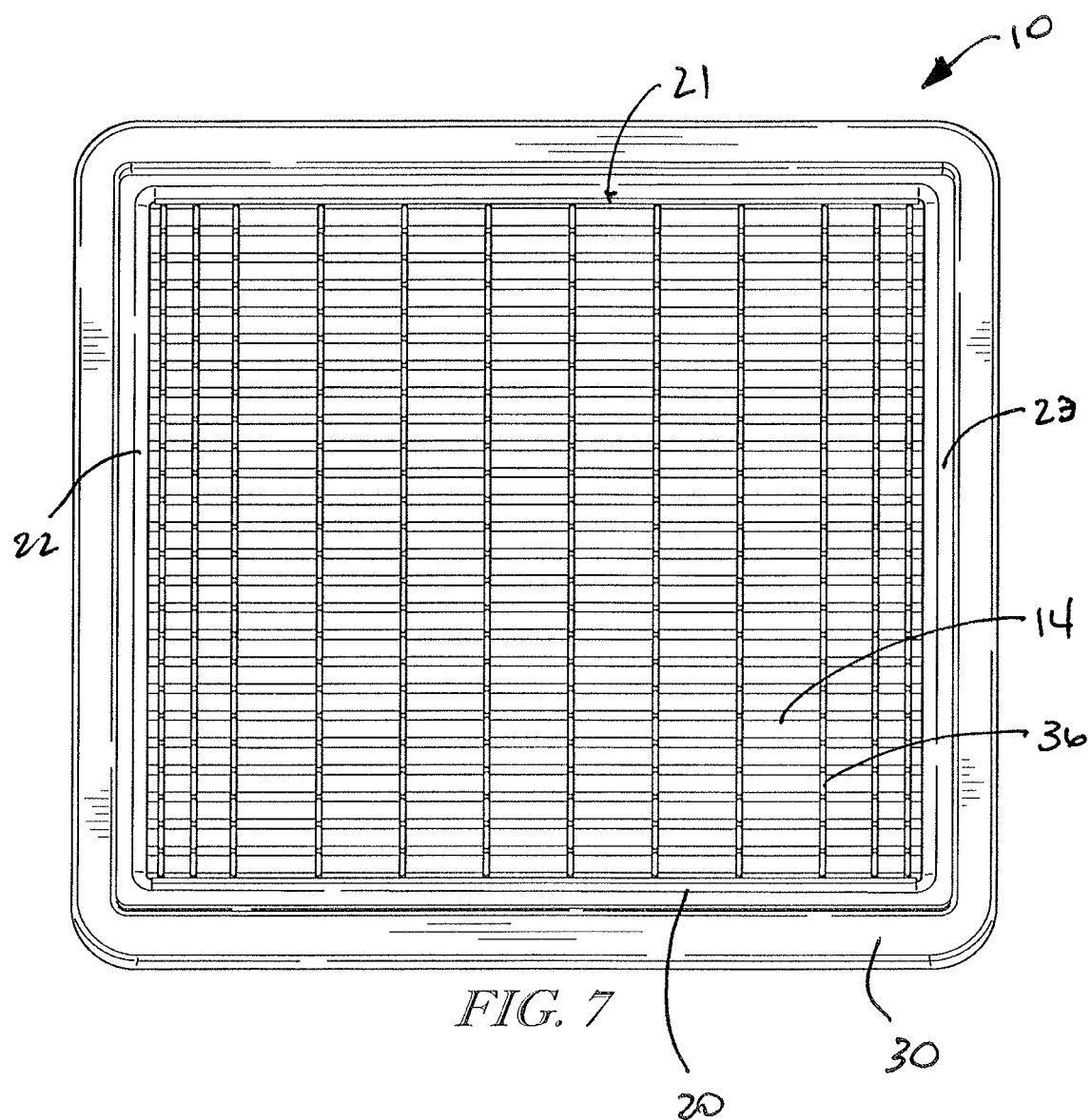
FIG. 7 is a bottom view of the air filter of FIG. 1.

An air filter 10 in accordance with the present teachings is shown in FIG. 1. Air filter 10 is adapted to be placed within an air cleaner assembly within a motor vehicle. The air filter 10 is adapted to remove particulate matter and other contaminates from the incoming air stream. Air filter 10 includes a filter pack 12 that utilizes a series of deep filter pleats 14 that are manufactured to include small air gaps 16 between the pleats 14.

Figure 36:
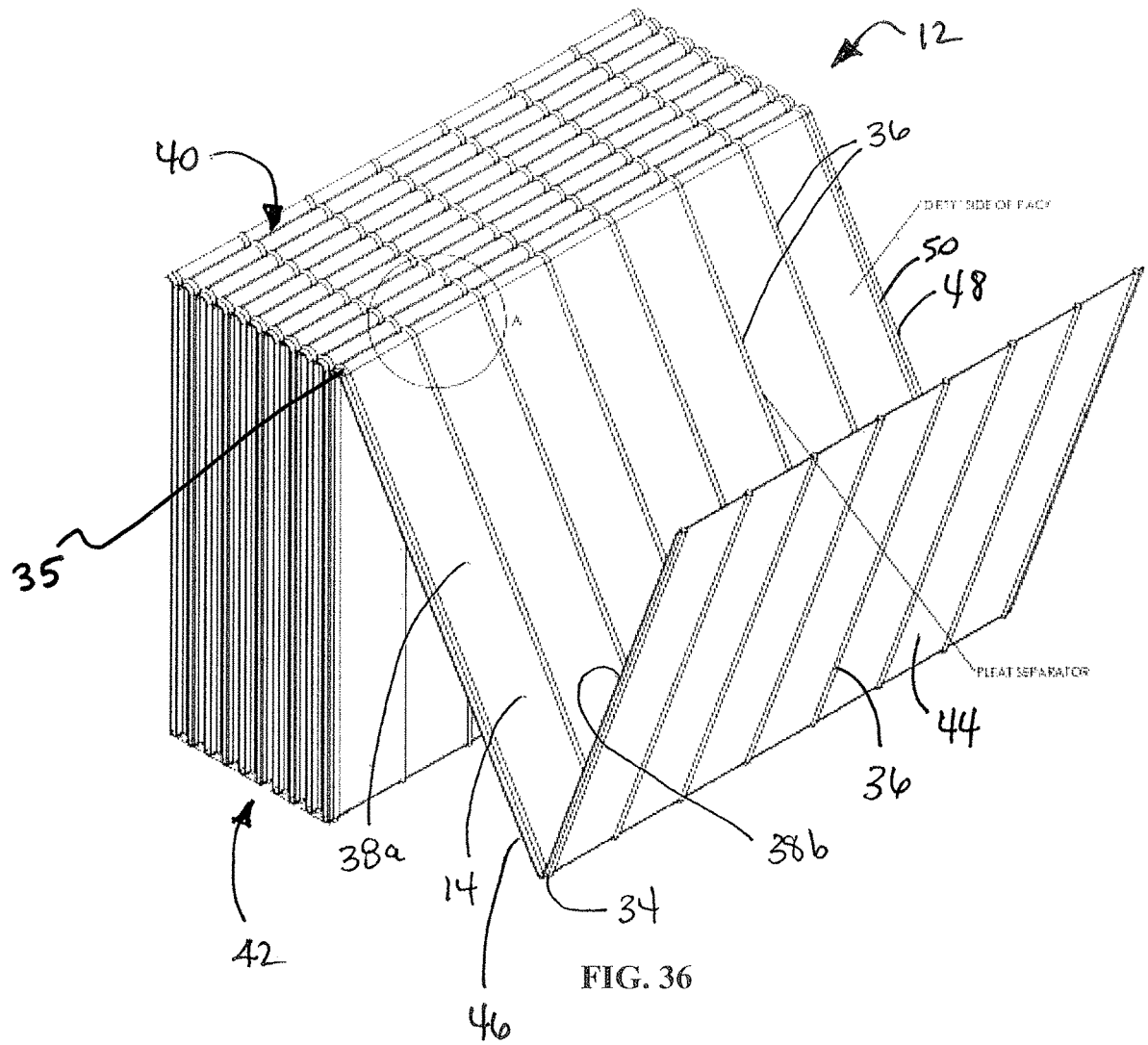
FIG. 36 is a perspective view of the filter pack used in the air filter showing the folds of the pleats and glue bead separators.

As shown in FIG. 36, the filter pack 12 includes a filter medium 44 that includes a plurality of pleats 14. The filter medium 44 comprises an upper flow face 40 containing a plurality of ridge fold edges 35 and an opposing lower flow face 42 containing a plurality of furrow fold edges 34. As shown in FIG. 36, the ridge fold edges 35 and the furrow fold edges 34 alternate throughout the filter medium 44.

In the example of FIG. 1, the air filter 10 is rectangular in shape and is designed to be positioned within an air filter housing (not shown). Air filter 10 includes a frame member 18, as shown in FIGS. 1-7. In some embodiments, frame member 18 is made using an injection molding process. Frame member 18 includes four side walls 20, 21, 22, 23 that are interconnected to form a rectangle. A lower edge 24 of each of the side walls 20, 21, 22, 23 includes an outwardly extending flange 26. Wall 20 is shorter in height than wall 21 and walls 22 and 23 include an angled bottom edge to form a slope.

Flange 26 extends around the perimeter of the frame member 18 at the lower edge 24, as shown in FIG. 1. An elastomeric material is overmolded or adhered onto the flange 26 to form a gasket 30 around the perimeter. The dimensions of walls 20, 21, 22, 23 place flange 26 in a plane that is at an angle to an upper flow face 28 of air filter 10. Gasket 30 is adapted to be used for axial compression within a two-part air filter housing. Frame member 18 includes a series of structural braces 32 that extend across the top opening of the frame member 18. Structural braces 32 are interconnected to the side walls 20, 21, 22, 23 and provide rigidity to the frame member 18. While one type of brace arrangement is used, it is contemplated that other brace designs could be used to provide the desired structural rigidity to the air filter 10.

Filter pack 12 is of similar designs for all embodiments of the air filter 10. In some embodiments, filter pack 12 is manufactured from traditional air filter paper material used in numerous commercial air filters. In some embodiments, an air filter paper material in accordance with the present teachings includes cellulose fibers. In some embodiments, the air filter paper material includes cellulose fibers and a binding resin (e.g., a phenolic resin). In other embodiments, the air filter paper material includes synthetic fibers, including but not limited to polyester fibers and/or glass fibers. In further embodiments, the air filter paper material includes a blend of cellulose fibers and synthetic fibers. In some embodiments, the paper material is treated with a wetting agent. In some embodiments, the wetting agent is present in a concentration ranging from about 0.006 to about 0.04 grams per square inch of medium surface area.

As best shown by FIG. 36, filter pack 12 in accordance with the present teachings includes a series of pleat separators 36 identically aligned on each side surface of the pleats 14. Although the separators 36 are continuous in some embodiments, they may be intermittent along their length as long as they are identically aligned back to back on each side of the pleats 14. If intermittent, the pattern would be a non-continuous, repeating pattern. The separators 36 are formed from an adhesive material that is viscous enough for the pleats 14 to be folded and compressed with adjacent pleats without closing the spacing between the pleats.

Pleat separation is maintained by the series of pleat separators 36 positioned between each pleat 14. In some embodiments, pleat separators 36 run in a direction parallel to the height dimension of each pleat 14. Pleat separators 36 may consist of hot melt adhesive, UV cured adhesive, moisture-cured adhesive, polymer filament winding, string, double sided tape or a combination thereof.

In some embodiments, a deep-pleated filter pack in accordance with the present teachings, as exemplified by the filter pack 12 shown in FIG. 36, may be assembled by first applying substantially continuous beads of an adhesive—in some embodiments, an adhesive curable via a two-step curing mechanism—along each of a first outer edge 46 of a filter medium 44 and an opposite second outer edge 48 of the filter medium 44. The adhesive is also applied on both sides of the filter medium 44 in spaced-apart rows interposed between the first outer edge 46 and the second outer edge 48. The spaced-apart rows on one side of the filter medium 44 are substantially aligned with corresponding spaced-apart rows on the opposite side of the filter medium 44. In some embodiments, prior to deposition of the adhesive to the filter medium 44, the filter medium 44 may be treated with a wetting agent. In some embodiments, the wetting agent is deposited in spaced-apart rows adjacent to but separate from the spaced-apart rows that will eventually receive the adhesive. In some embodiments, after the adhesive has been applied to the filter medium 44, the wetting agent previously applied to the filter medium 44 in rows separate from the rows in which the adhesive was applied may spread into those rows of the filter medium 44 that received the adhesive.

Prior to folding the filter medium 44, the two-step curable adhesive is tackified (e.g., made into a tacky gel) through the application of the first step of the two-step curing mechanism, whereby the adhesive becomes better configured to stick to itself when brought in contact with additional tackified adhesive provided on the face of a soon-to-be adjacent opposing pleat. In some embodiments, the first step of the two-step curing mechanism includes UV curing. In some embodiments, the adhesive to be cured by the first step of the two-step curing mechanism does not include a solvent.

The tackified adhesive generated in the first step of the two-step curing mechanism acts as a pleat separator 36 to keep adjacent pleats 14 separated from one another. Once adhesive has been applied to both sides of the filter medium 44 as well as to the outer edges 46, 48 of the filter medium 44 and the adhesive has been partially cured, the filter medium 44 is folded to form the filter pack 12. In some embodiments, the pleat separators 36 run in a direction parallel to the height dimension of each pleat 14. After formation of the filter pack 12, the tackified adhesive is further solidified through a post-curing second-step of the two-step curing mechanism. In some embodiments, the second step of the two-step curing mechanism includes moisture curing (e.g., using moisture in the air).

After the moisture post-curing step has been completed and the filter pack 12 has been fully formed, a second adhesive is applied to the side walls 20, 21, 22, 23 of the frame member 18 and the filter pack 12 is inserted into the frame member 18 to secure the filter pack 12 therein. The second adhesive may be the same as or different than the two-step curable first adhesive described above. In some embodiments, the second adhesive requires no separate curing step, in other embodiments only a single curing step, and in further embodiments a two-step curing mechanism analogous to the first adhesive. The second adhesive not only bonds the filter pack 12 in the frame member 18 but also provides a seal therebetween. Gasket 30 can be overmolded or adhered onto frame 18 either before or after filter pack 12 is inserted into frame member 18.

As best shown by FIG. 36, the upper flow face 40 of the filter pack 12 is designed to accept incoming "dirty" air, which passes through the filter media 44. The filter media captures the debris from the air and the "clean" air exits from the lower flow face 42. The deep draw filter pack design allows for the creation of a filter having high airflow rates as well as significant particulate capture. The filter pack 12 is referred to as deep-pleated because of the contrast between the depth of the pleats 14 when compared to the spacing between pleats. The pleats 14 are generally parallel to adjacent pleats 14 after the filter pack 12 is assembled. The pleat pack 12 starts as continuous sheet of filter media 44 and it is folded such that the fold angle between pleats 14 is nominally zero degrees. This is based on the position that the fold edge 34 of unfolded filter media is 180 degrees prior to folding.

Figure 37:
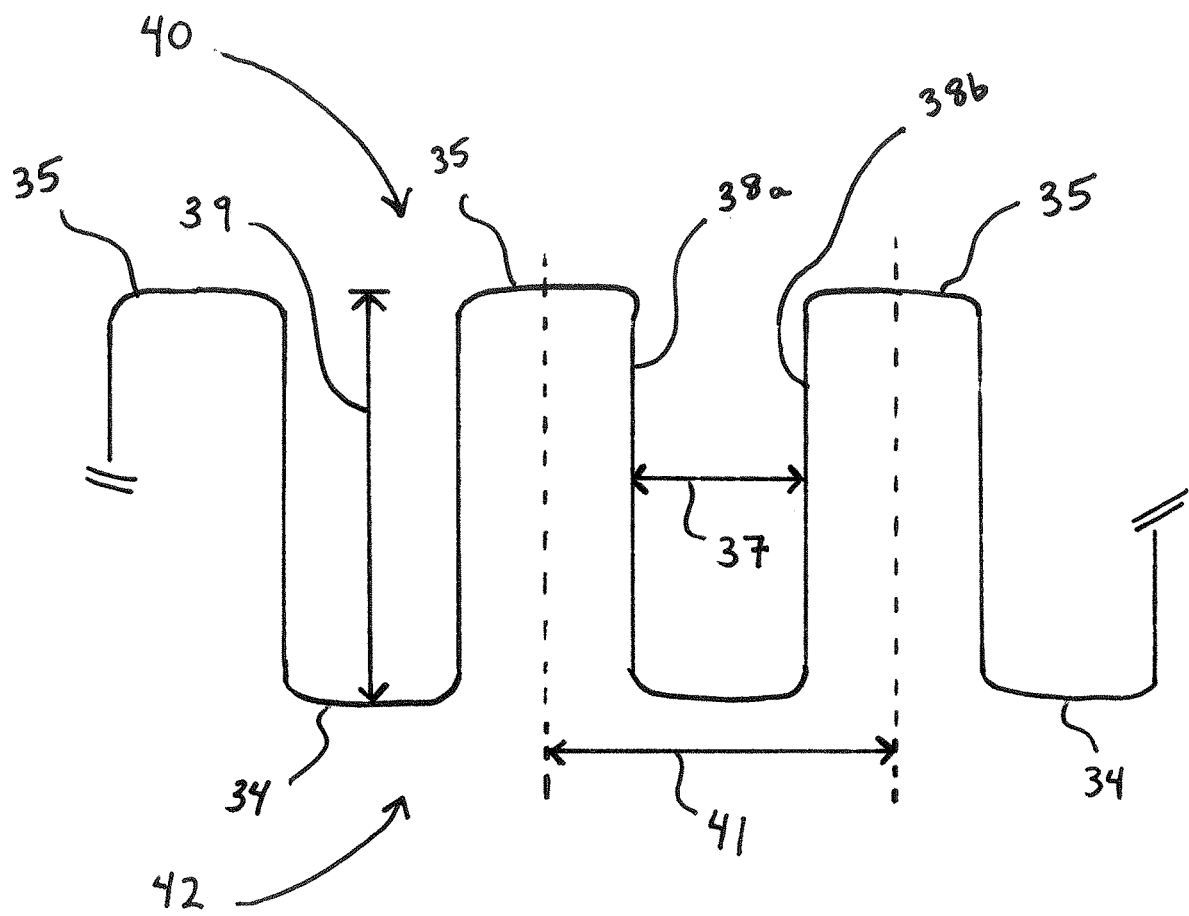
FIG. 37 is a schematic illustration of pleat depth, face-to-face pleat spacing, and centerline-to-centerline pleat spacing as measured herein.

FIG. 37 shows a simplified schematic illustration of the reference points used in determining pleat depth 39, face-to-face pleat spacing 37, and centerline-to-centerline pleat spacing 41 in accordance with the present teachings. In the simplified schematic of FIG. 37, the pleat separators 36 of FIG. 36 have been omitted for the sake of clarity since they are not used in the respective measurements. In some embodiments, the height of the pleats 14 of filter pack 12 (i.e., the pleat depth 39 as measured from ridge fold edge 35 to furrow fold edge 34) can be from about 2.50 inches to about 12.00 inches in length from fold edge 34 to fold edge 35. In some embodiments, the height of the pleats 14 is from about 4.00 inches to about 12.00 inches in length from fold edge 34 to fold edge 35 and, in other embodiments, from about 6.00 inches to about 12.00 inches in length from fold edge 34 to fold edge 35. The maximum pleat depth is not constrained except by size restrictions that may be imposed by the machinery used for the production of the filter pack. Thus, in some embodiments, the pleat depth may be larger than about 12.00 inches.

The spacing between each pleat separator may range from about 0.750 inches to about 1.250 inches in order to provide proper spacing between pleats 14 for airflow. To prevent bypass of unfiltered air, the two outer edges 46, 48 of the pleats 14 of the filter pack 12 are sealed by continuous adhesive beads 50 dispensed on the filter media 44 prior to being folded into pleated form.

Pleats 14 are arranged so that spaces 16 are formed between the pleats to accommodate airflow, as shown in FIG. 1. As best shown by the schematic in FIG. 37, the spacing 37 between adjacent pleat faces 38a and 38b may range from about 0.050 inches to about 0.100 inches and, in some embodiments, from about 0.053 inches to about 0.079 inches. In other embodiments, the face-to-face pleat spacing between first pleat face 38a and adjacent pleat face 38b is about 0.066 inches or about 0.067 inches. The filter pack 12 is formed to include an upper flow face 40 and lower flow face 42 that is at the opposite end of the upper flow face 40. In some embodiments, the centerline-to-centerline spacing 41 between adjacent pleats, as shown in the schematic in FIG. 37, ranges from about 0.130 inches to about 0.194 inches. In other embodiments, the centerline-to-centerline spacing 41 is about 0.162 inches.

In a filter pack in accordance with the present teachings, a ratio of (a) the pleat depth 39 as measured from the ridge fold edges 35 to the furrow fold edges 34 to (b) the pleat spacing 37 as measured from a first pleat face 38a to an adjacent pleat face 38b may be one of several different values or fall within one of several different ranges. For example, it is within the scope of the present teachings to select a ratio to be greater than or equal to any one of the following values: about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, or 280.

It is also within the scope of the present teachings for the ratio of the pleat depth 39 to the pleat spacing 37 for a filter pack in accordance with the present teachings to fall within one of many different ranges. In a first set of ranges, the ratio of the pleat depth 39 to the pleat spacing 37 for a filter pack in accordance with the present teachings is in one of the following ranges: about 25 to 300, 30 to 300, 35 to 300, 40 to 300, 45 to 300, 50 to 300, 55 to 300, 60 to 300, 65 to 300, 70 to 300, 75 to 300, 80 to 300, 85 to 300, 90 to 300, 95 to 300, 100 to 300, 105 to 300, 110 to 300, 115 to 300, 120 to 300, 125 to 300, 130 to 300, 135 to 300, 140 to 300, 145 to 300, 150 to 300, 155 to 300, 160 to 300, 165 to 300, 170 to 300, 175 to 300, 180 to 300, 185 to 300, 190 to 300, 195 to 300, 200 to 300, 205 to 300, 210 to 300, 215 to 300, 220 to 300, and 225 to 300. In a second set of ranges, the ratio of the pleat depth 39 to the pleat spacing 37 for a filter pack in accordance with the present teachings is in one of the following ranges: about 25 to 299, 25 to 295, 25 to 290, 25 to 285, 25 to 280, 25 to 275, 25 to 270, 25 to 265, 25 to 260, 25 to 255, 25 to 250, 25 to 245, 25 to 240, 25 to 235, 25 to 230, 25 to 225, 25 to 220, 25 to 215, 25 to 210, 25 to 205, 25 to 200, 25 to 195, 25 to 190, 25 to 185, 25 to 180, 25 to 175, 25 to 170, 25 to 165, 25 to 160, 25 to 155, 25 to 150, 25 to 145, 25 to 140, 25 to 135, 25 to 130, 25 to 125, 25 to 120, 25 to 115, 25 to 110, 25 to 105, 25 to 100, 25 to 95, 25 to 90, 25 to 85, 25 to 80, 25 to 75, 25 to 70, 25 to 65, 25 to 60, 25 to 55, 25 to 50, 25 to 45, 25 to 40, 25 to 35, and 25 to 30. In a third set of ranges, the ratio of the pleat depth 39 to the pleat spacing 37 for a filter pack in accordance with the present teachings is in one of the following ranges: about 26 to 299, 30 to 295, 35 to 290, 40 to 285, 45 to 280, 50 to 275, 55 to 270, 60 to 265, 65 to 260, 70 to 255, 75 to 250, 80 to 245, 85 to 240, 90 to 235, 95 to 230, 100 to 225, 105 to 220, 110 to 215, 115 to 210, 120 to 205, 125 to 200, 130 to 195, 135 to 190, 140 to 185, 145 to 180, 150 to 175, 155 to 170, and 160 to 165.

As shown in FIG. 1, the frame member 18 is secured to a filter pack 12 in accordance with the present teachings with an adhesive. Due to the deep draw of the filter pack 12, the filter pack 12 extends down past the bottom of the frame member 18. The bond between the frame member 18 and the filter pack 12 is achieved by a continuously dispensed adhesive bead on the interior surfaces of the side walls 20, 21, 22, 23 of the frame member 18. The interior surfaces of the frame member 18 lie within individual planes, one of which is perpendicular to the remaining two, which are parallel. The adhesive used to secure the filter pack 12 to the frame member 18 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 30 extends around the perimeter of frame member 18 and is the mechanism that forms an airtight seal between the air filter 10 and the air cleaner housing in which the air filter 10 is contained during use. Gasket 30 is overmolded directly to the frame member 18 with no additional materials needed to maintain adhesion between the two elements. Alternatively, gasket 30 is bonded to the frame member 18 using a continuous bead of adhesive. Gasket 30 can be designed to provide either a radially directed seal to the air cleaner housing or can be designed to form a pinch type seal between surfaces in the air cleaner housing. With the present design, no portion of the gasket 30 is in direct contact with the pleated filter pack 12. Gasket 30 is comprised of an elastomeric material with a Shore A hardness of less than 20 Shore Hardness Units.

Another embodiment of an air filter 200 is rectangular in shape and is designed to be positioned within an air filter housing (not shown). Air filter 200 includes a frame member 218, as shown in FIGS. 8-14. In some embodiments, frame member 218 is made using an injection molding process. Frame member 218 includes four side walls 220, 221, 222, 223 that are interconnected to form a rectangle. A lower edge 224 of each of the side walls 220, 221, 222, 223 includes an outwardly extending flange 226. Wall 220 is shorter in height than wall 221 and walls 222 and 223 include an angled bottom edge to form a slope.

Figure 8:
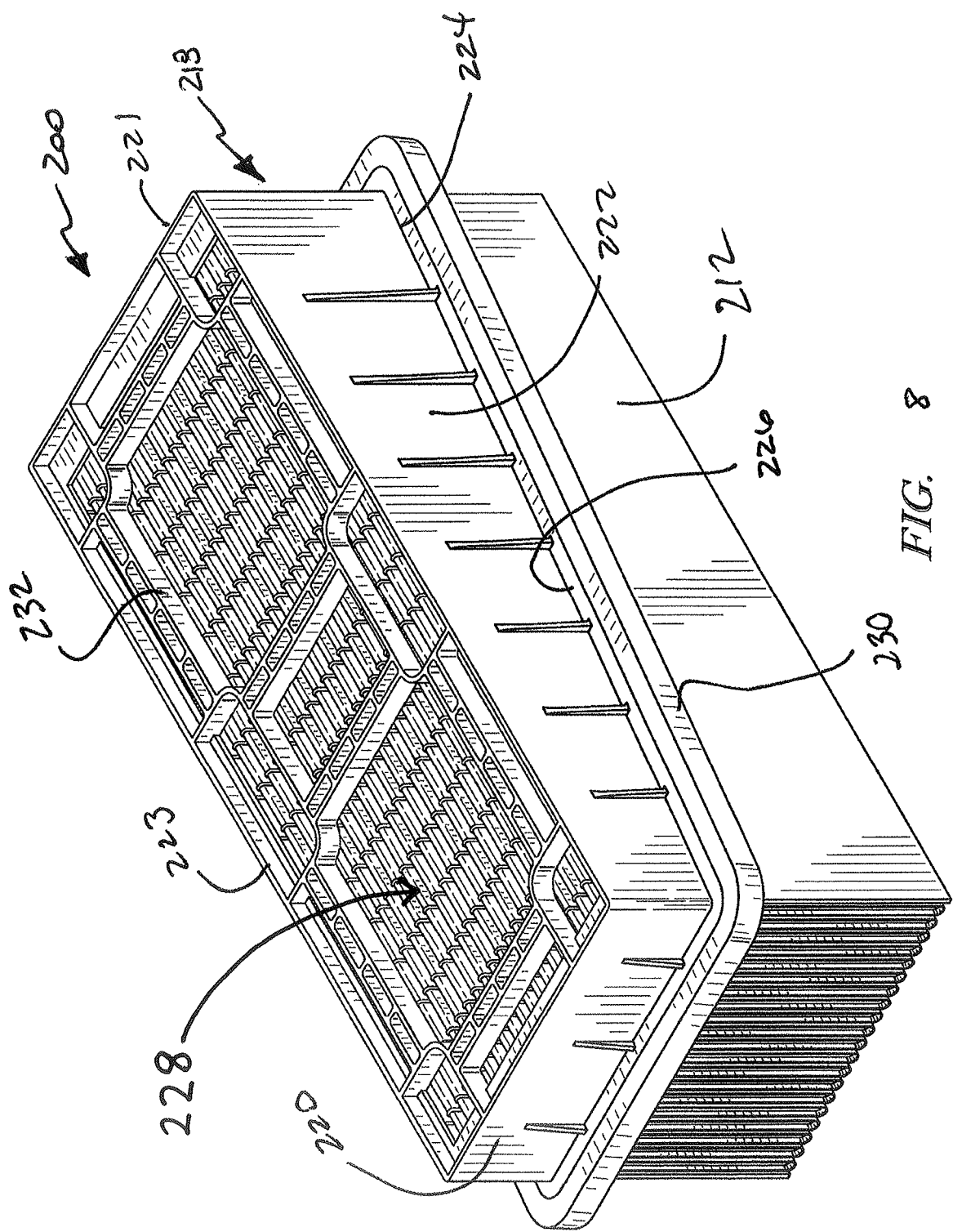
FIG. 8 is a perspective view of a second embodiment of an air filter showing a frame member, a deep-pleated filter pack, a portion of which is positioned within the frame member, and a gasket extending around the perimeter of the frame member, the pleat pack formed from a series of vertical pleats.
Figure 12:
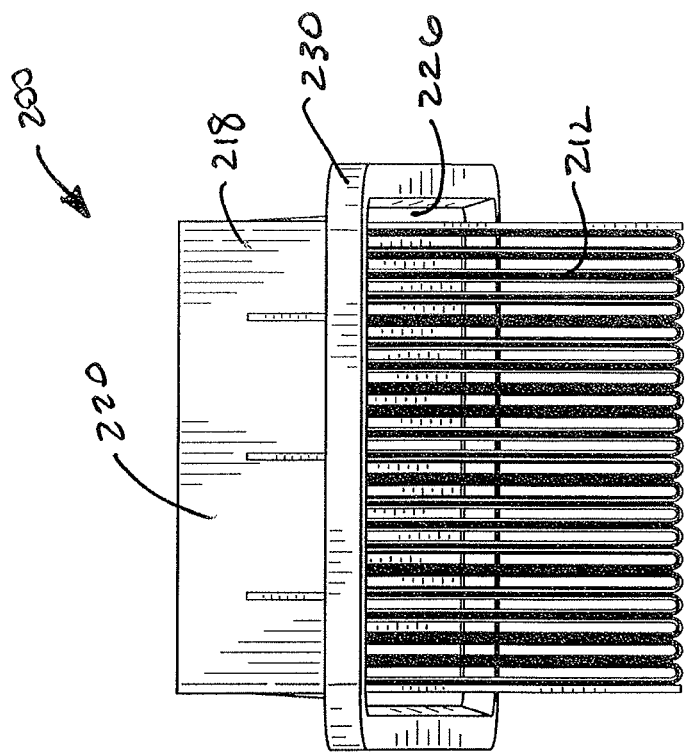
FIG. 12 is a rear view of the air filter of FIG. 8.
Figure 11:
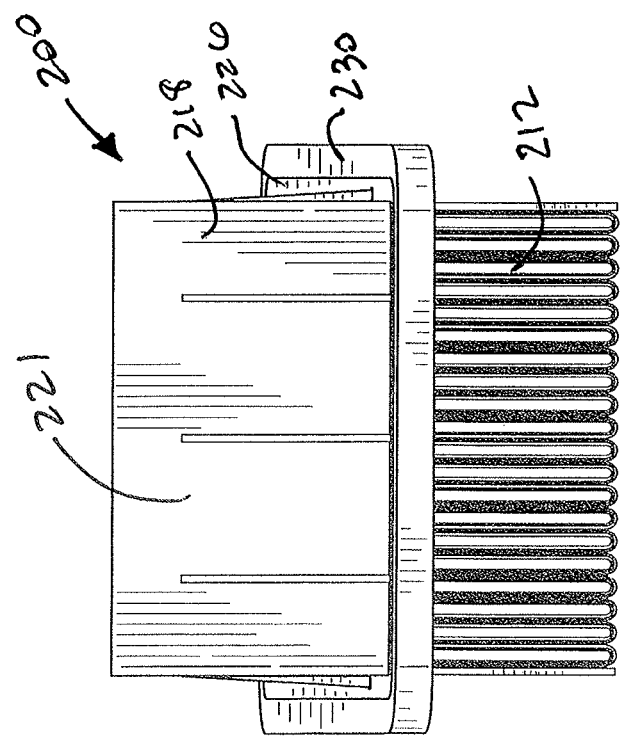
FIG. 11 is a front view of the air filter of FIG. 8.
Figure 13:
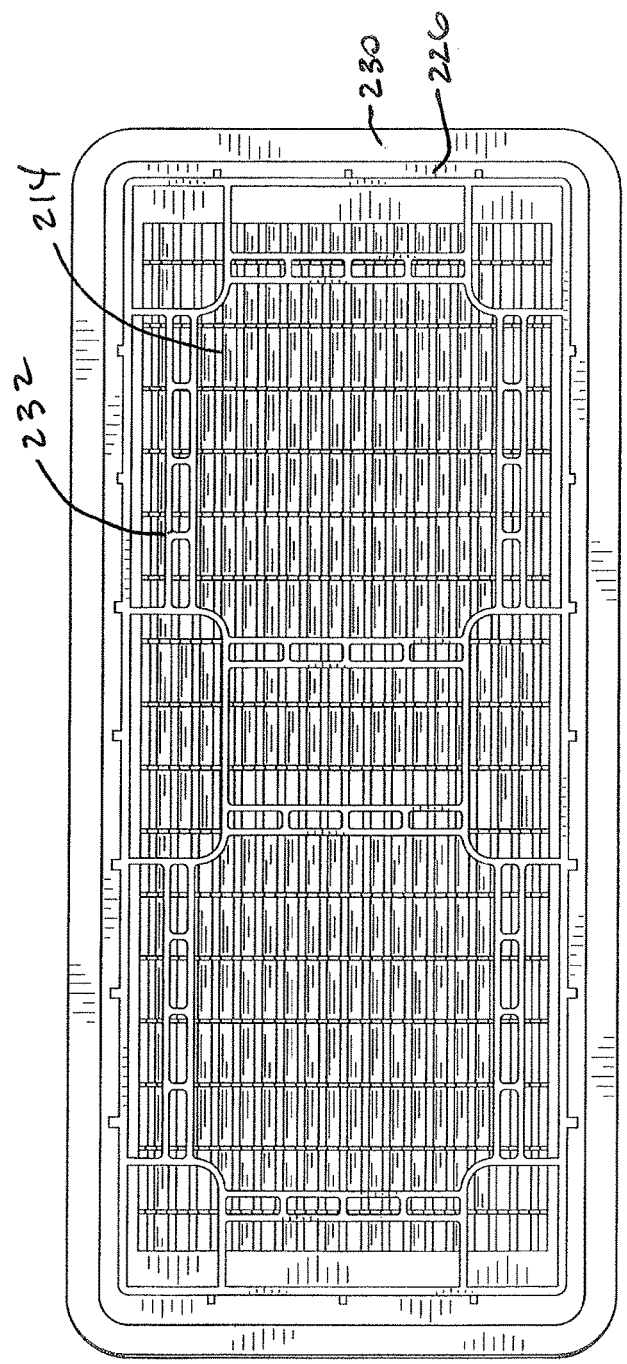
FIG. 13 is a top view of the air filter of FIG. 8.
Figure 14:
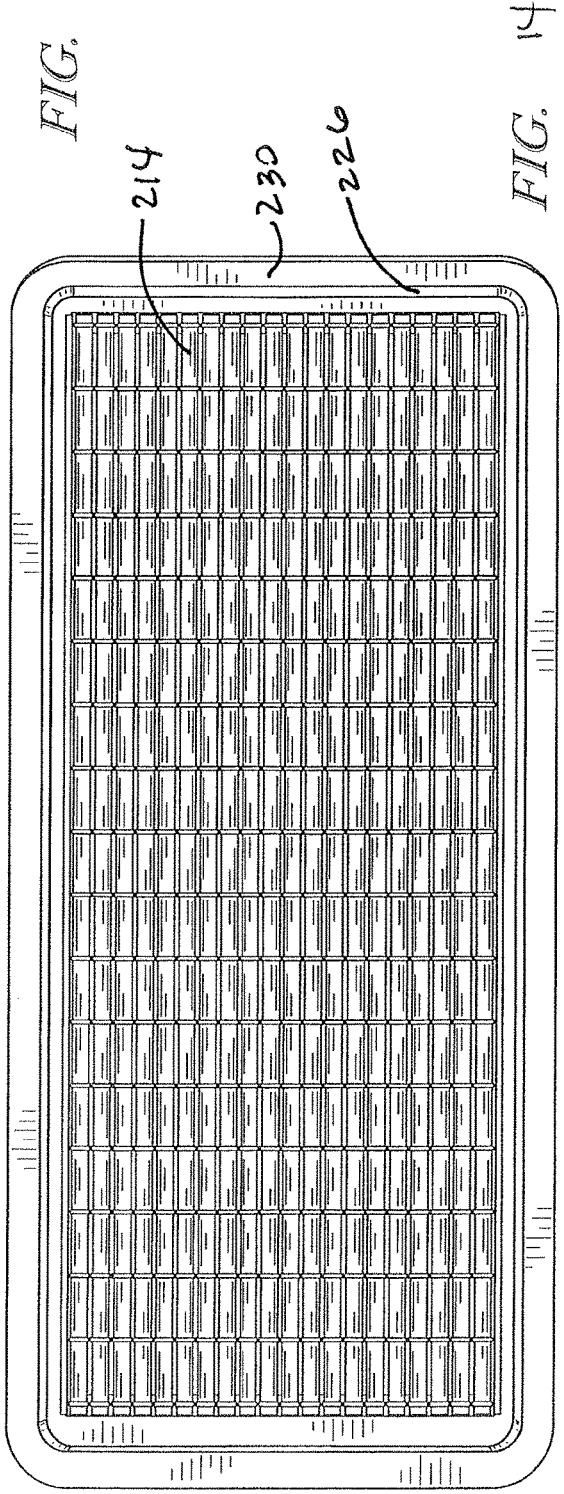
FIG. 14 is a bottom view of the air filter of FIG. 8.

Flange 226 extends around the perimeter of the frame member 218 at the lower edge 224, as shown in FIG. 8. An elastomeric material is overmolded or adhered onto the flange 226 to form a gasket 230 around the perimeter. The dimensions of walls 220, 221, 222, 223 place flange 226 in a plane that is at an angle to an upper flow face 228 of air filter 200. Gasket 230 is adapted to be used for axial compression within a two-part air filter housing. Frame member 218 includes a series of structural braces 232 that extend across the top opening of the frame member 218. Structural braces 232 are interconnected to the side walls 220, 221, 222, 223 and provide rigidity to the frame member 218. While one type of brace arrangement is used, it is contemplated that other brace designs could be used to provide the desired structural rigidity to the air filter 200.

The frame member 218 is secured to the filter pack 212 with an adhesive. Due to the deep draw of the filter pack 212, the filter pack 212 extends down past the bottom of the frame member 218. The bond between the frame member 218 and the filter pack 212 is achieved by a continuously dispensed adhesive bead on the interior surfaces of the side walls 220, 221, 222, 223 of the frame member 218. The interior surfaces of the frame member 218 lie within individual planes, one of which is perpendicular to the remaining two, which are parallel. The adhesive used to secure the filter pack 212 to the frame member 218 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 230 extends around the perimeter of frame member 218 and is the mechanism that forms an airtight seal between the air filter 200 and the air cleaner housing in which the air filter 200 is contained during use. Gasket 230 is overmolded directly to the frame member 218 with no additional materials needed to maintain adhesion between the two elements. Alternatively, gasket 230 is bonded to the frame member 218 using a continuous bead of adhesive. Gasket 230 can be designed to provide either a radially directed seal to the air cleaner housing or can be designed to form a pinch type seal between surfaces in the air cleaner housing.

Another embodiment of an air filter 300 is rectangular in shape and is designed to be positioned within an air filter housing (not shown). Air filter 300 includes a frame member 318, as shown in FIGS. 15-21. In some embodiments, frame member 318 is made using an injection molding process. Frame member 318 includes four side walls 320, 321, 322, 323 that are interconnected to form a rectangle. A lower edge 324 of each of the side walls 320, 321, 322, 323 includes an outwardly extending flange 326. Wall 320 is shorter in height than wall 321 and walls 322 and 323 include an angled bottom edge to form a slope.

Figure 15:
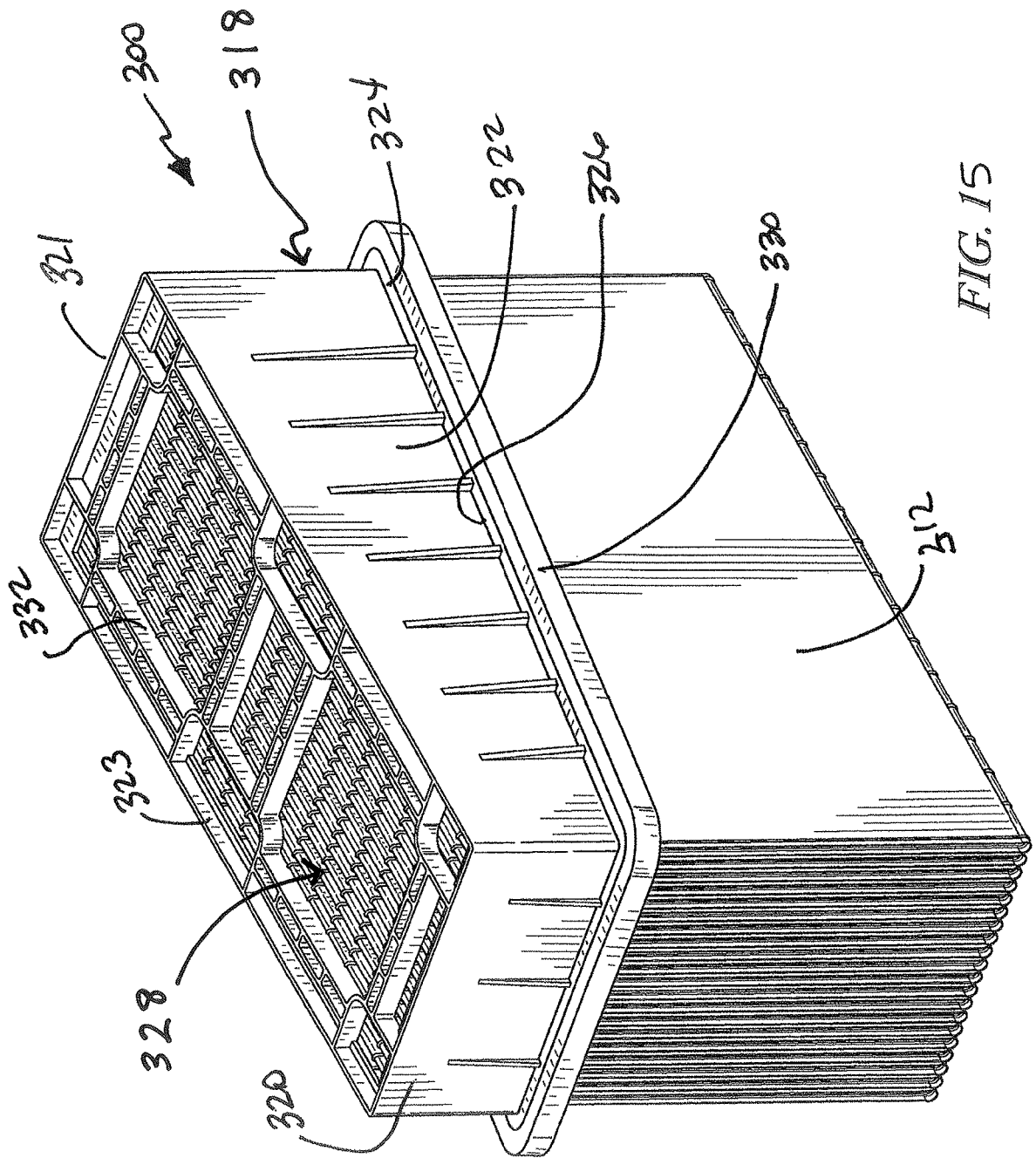
FIG. 15 is a perspective view of a third embodiment of an air filter showing a frame member, a deep-pleated filter pack, a portion of which is positioned within the frame member, and a gasket extending around the perimeter of the frame member, the pleat pack formed from a series of vertical pleats.
Figure 16:
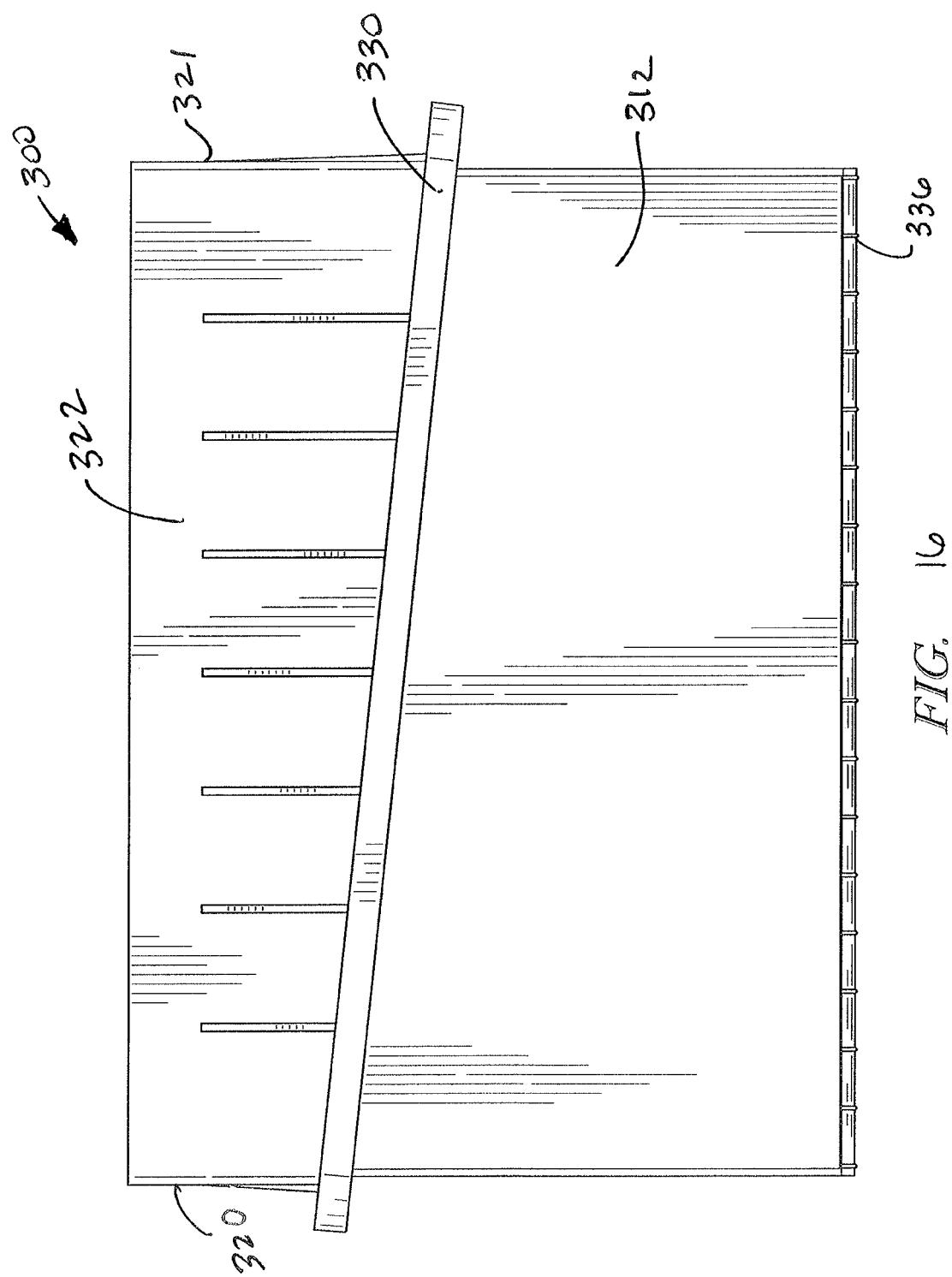
FIG. 16 is a side view of the air filter of FIG. 15.
Figure 17:
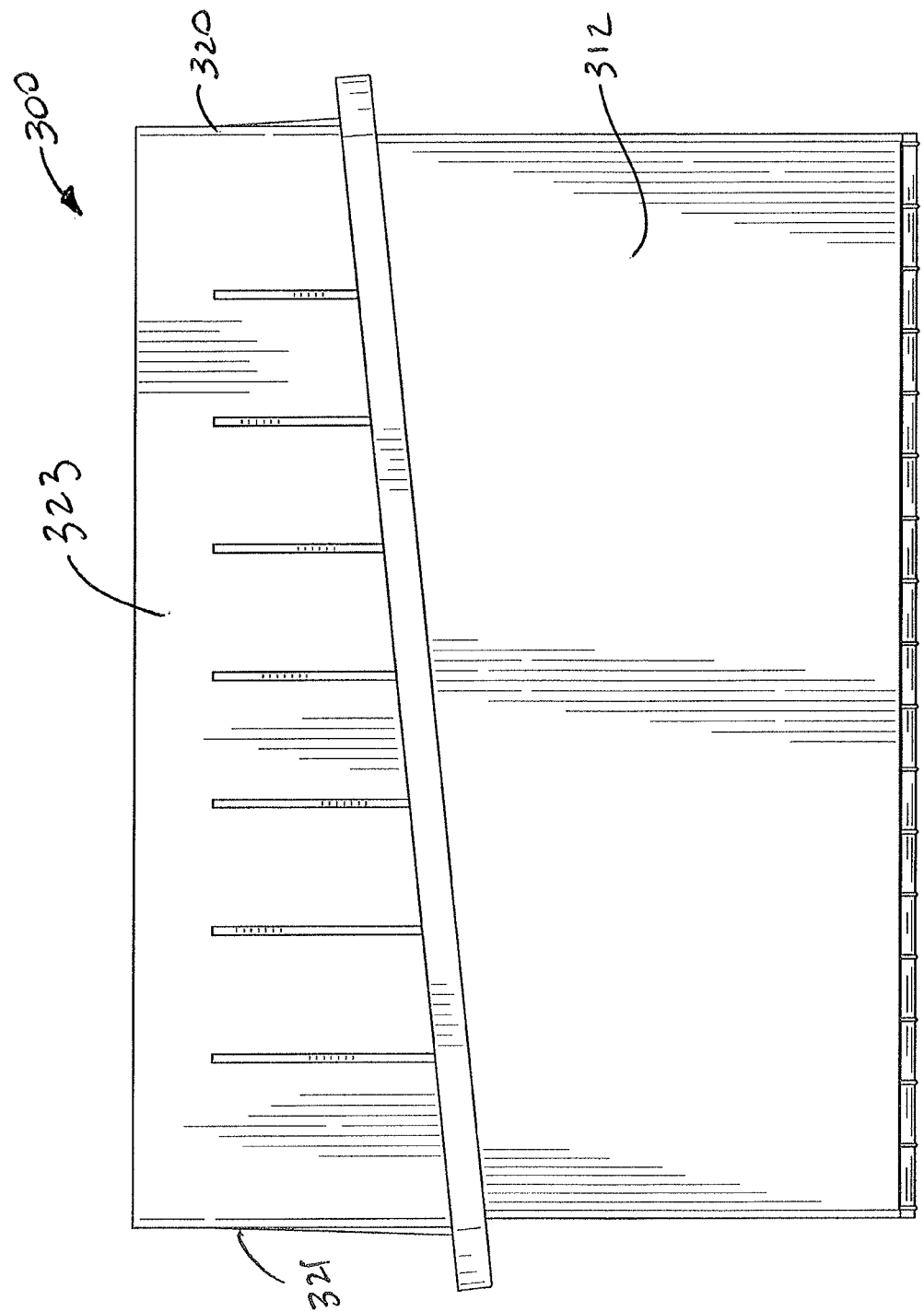
FIG. 17 is another side view of the air filter of FIG. 15.
Figure 19:
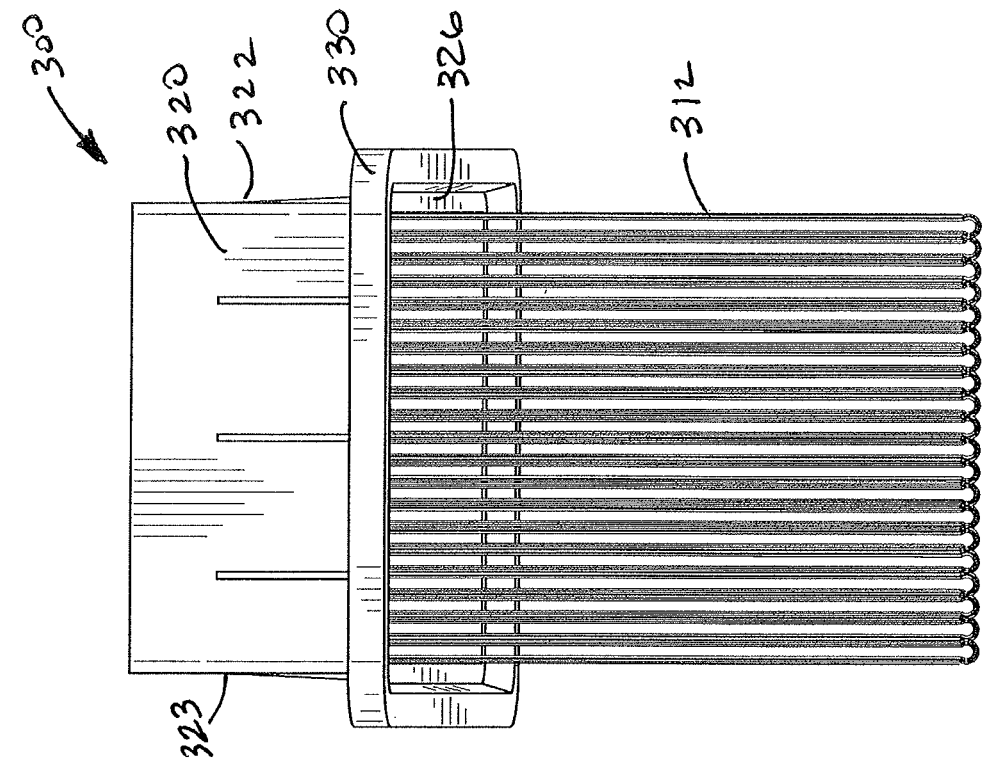
FIG. 19 is a rear view of the air filter of FIG. 15.
Figure 18:
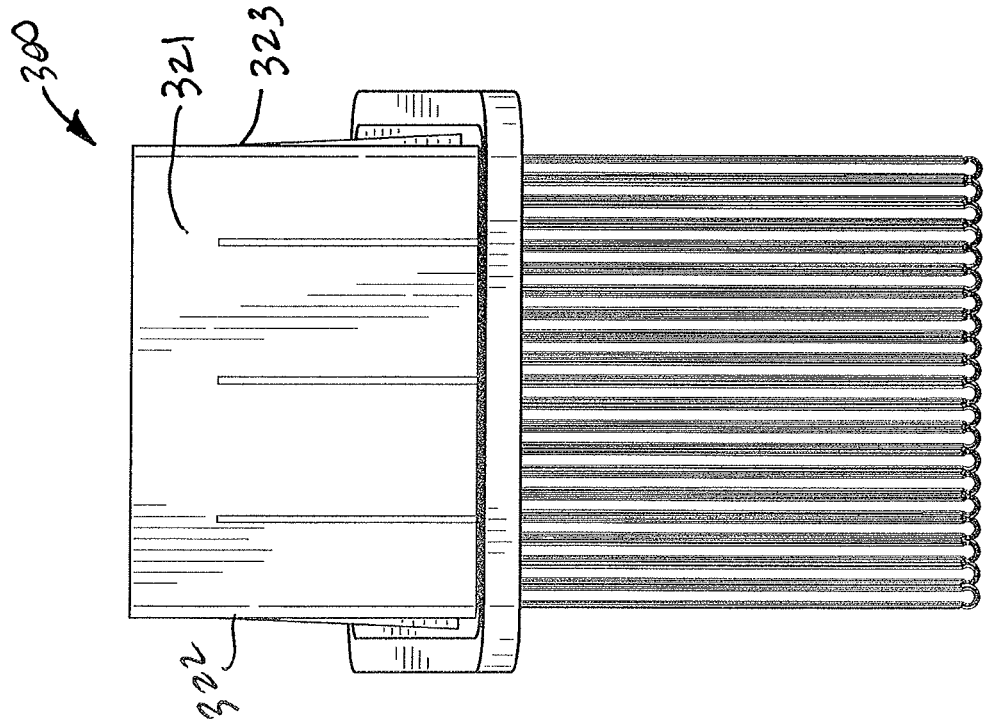
FIG. 18 is a front view of the air filter of FIG. 15.

Flange 326 extends around the perimeter of the frame member 318 at the lower edge 324, as shown in FIG. 15. An elastomeric material is overmolded or adhered onto the flange 326 to form a gasket 330 around the perimeter. The dimensions of walls 320, 321, 322, 323 place flange 326 in a plane that is at an angle to an upper flow face 328 of air filter 300. Gasket 330 is adapted to be used for axial compression within a two-part air filter housing. Frame member 318 includes a series of structural braces 332 that extend across the top opening of the frame member 318. Structural braces 332 are interconnected to the side walls 320, 321, 322, 323 and provide rigidity to the frame member 318. While one type of brace arrangement is used, it is contemplated that other brace designs could be used to provide the desired structural rigidity to the air filter 300.

The frame member 318 is secured to the filter pack 312 with an adhesive. Due to the deep draw of the filter pack 312, the filter pack 312 extends down past the bottom of the frame member 318. The bond between the frame member 318 and the filter pack 312 is achieved by a continuously dispensed adhesive bead on the interior surfaces of the side walls 320, 321, 322, 323 of the frame member 318. The interior surfaces of the frame member 318 lie within individual planes, one of which is perpendicular to the remaining two, which are parallel. The adhesive used to secure the filter pack 312 to the frame member 318 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 330 extends around the perimeter of frame member 318 and is the mechanism that forms an airtight seal between the air filter 300 and the air cleaner housing in which the air filter 300 is contained during use. Gasket 330 is overmolded directly to the frame member 318 with no additional materials needed to maintain adhesion between the two elements. Alternatively, gasket 330 is bonded to the frame member 318 using a continuous bead of adhesive. Gasket 330 can be designed to provide either a radially directed seal to the air cleaner housing or can be designed to form a pinch type seal between surfaces in the air cleaner housing.

Another embodiment of an air filter 400 is rectangular in shape and is designed to be positioned within an air filter housing (not shown). Air filter 400 includes a frame member 418, as shown in FIGS. 22-28. In some embodiments, frame member 418 is made using an injection molding process. Frame member 418 includes four side walls 420, 421, 422, 423 that are interconnected to form a rectangle. An edge 424 of each of the side walls 420, 421, 422, 423 includes an outwardly extending flange 426. At least some of the side walls 420, 421, 422, 423 taper inward from the edge 424 to the lower portion of the frame member 418.

Figure 22:
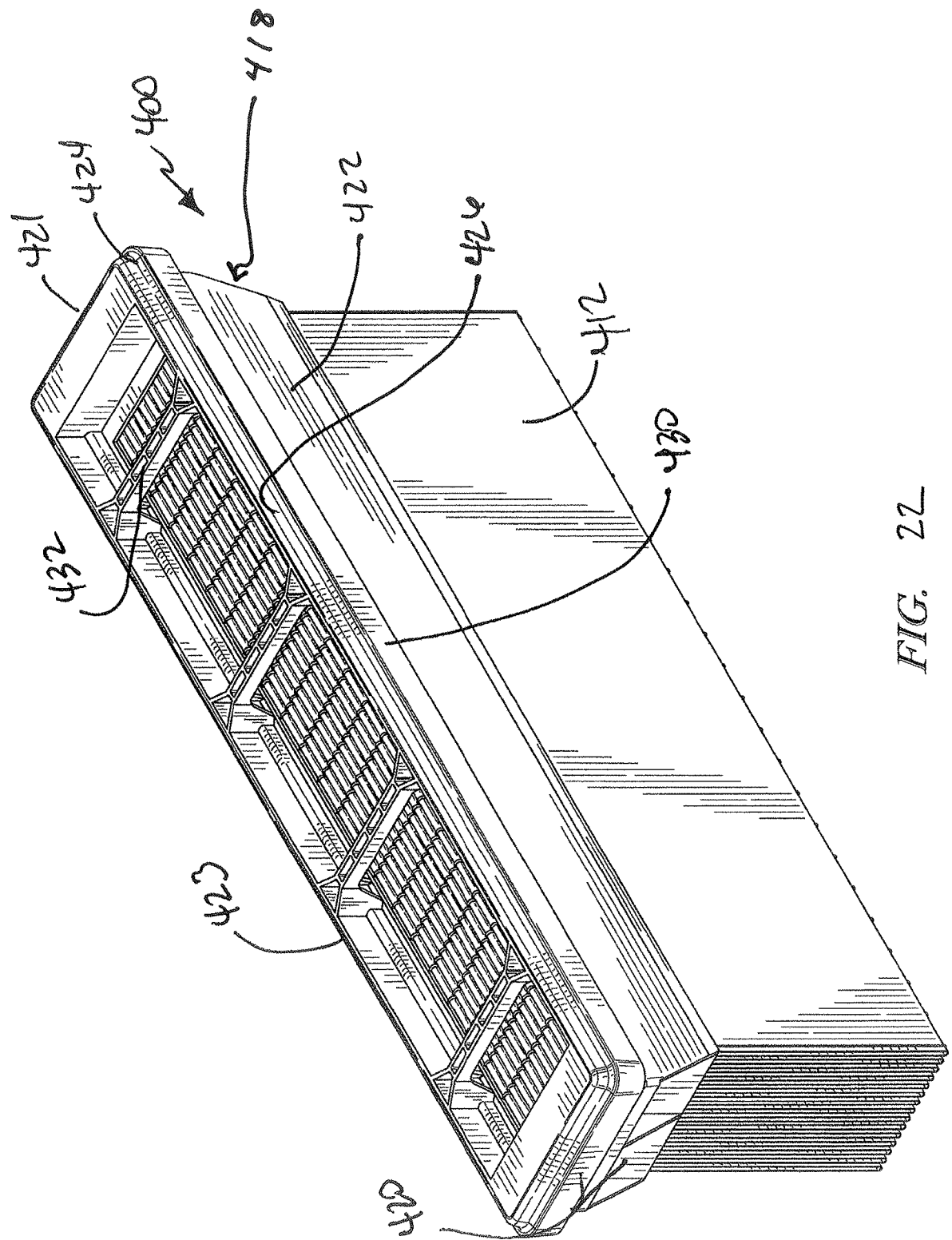
FIG. 22 is a perspective view of a fourth embodiment of an air filter showing a frame member, a deep-pleated filter pack, a portion of which is positioned within the frame member, and a gasket extending around the perimeter of the frame member, the pleat pack formed from a series of vertical pleats.
Figure 23:
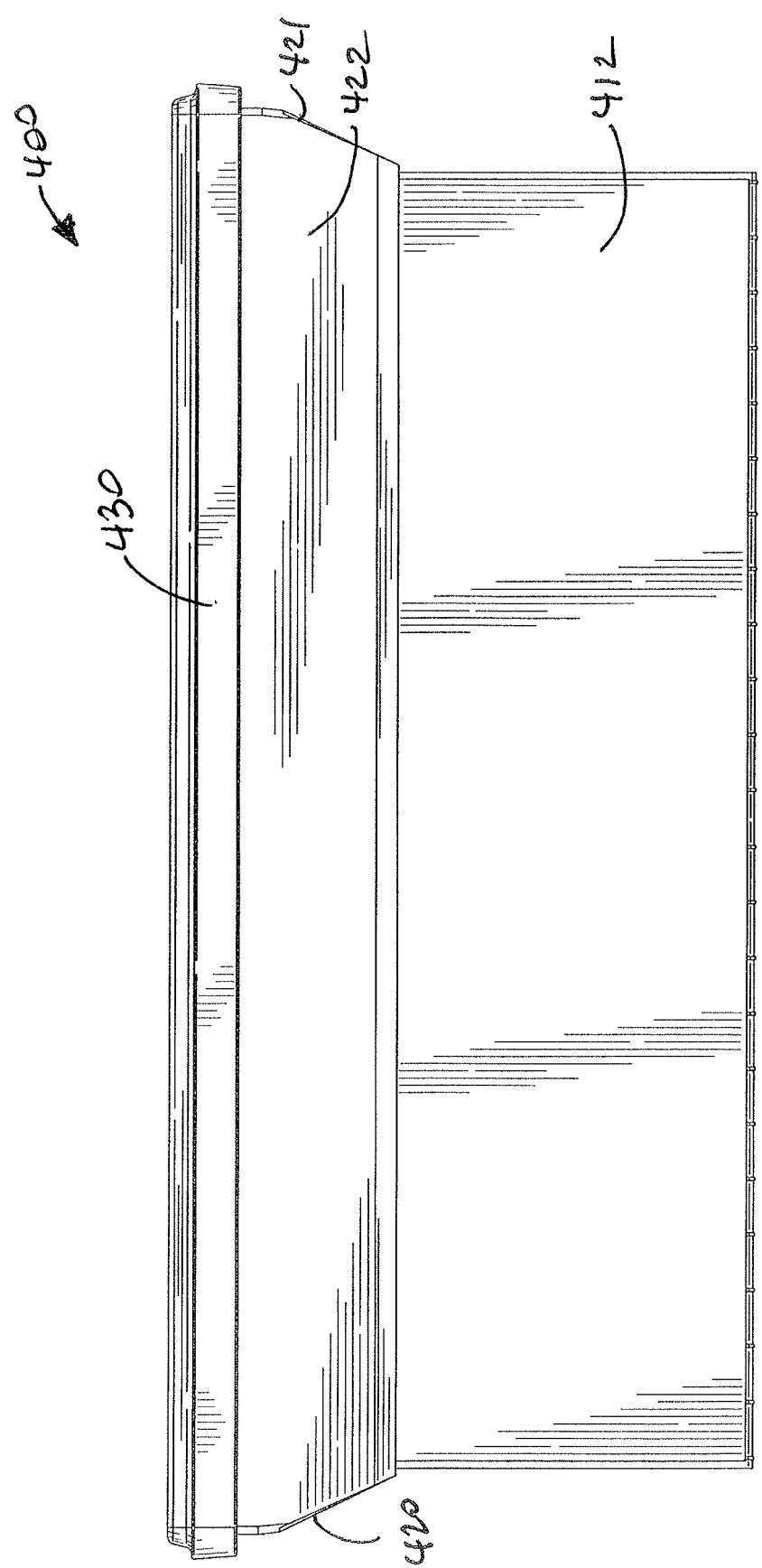
FIG. 23 is a side view of the air filter of FIG. 22.
Figure 24:
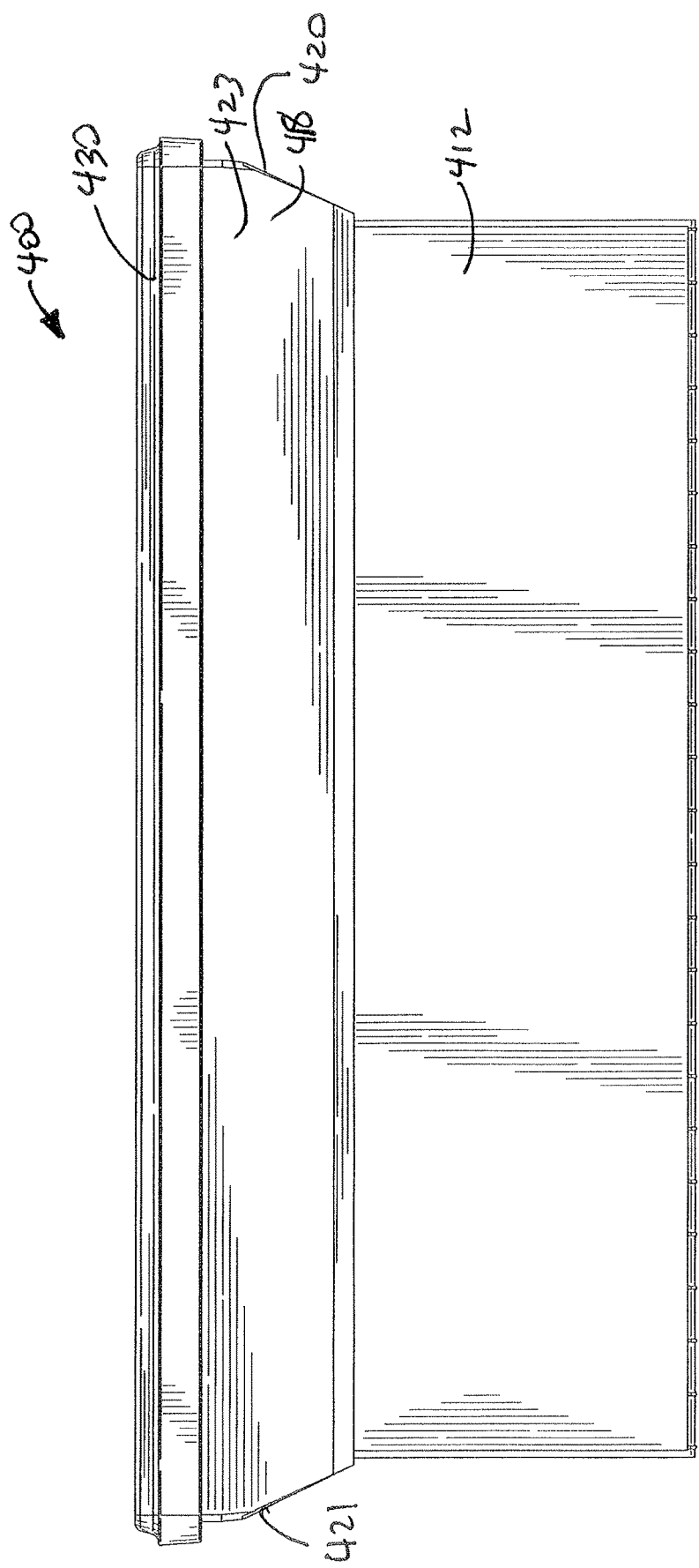
FIG. 24 is another side view of the air filter of FIG. 22.
Figure 26:
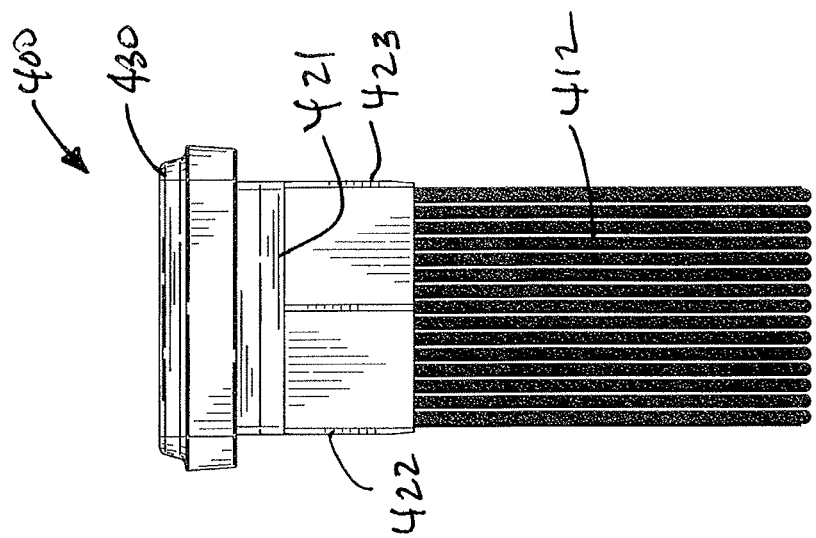
FIG. 26 is a rear view of the air filter of FIG. 22.
Figure 25:
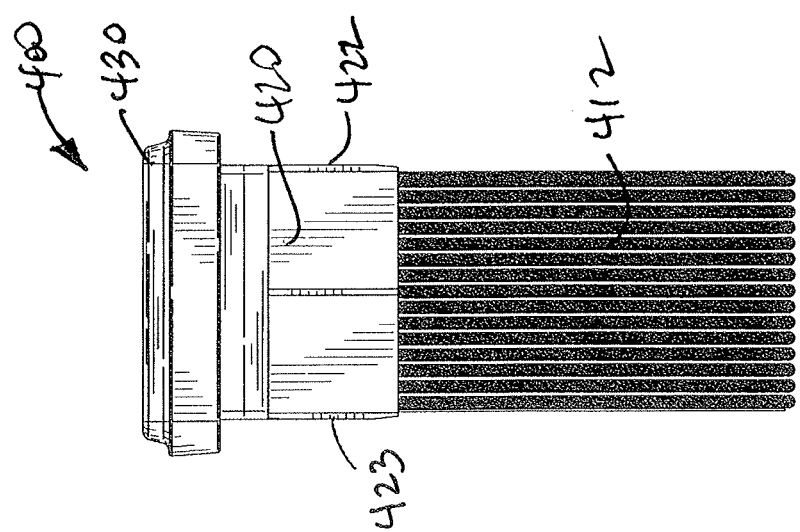
FIG. 25 is a front view of the air filter of FIG. 22.
Figure 27:
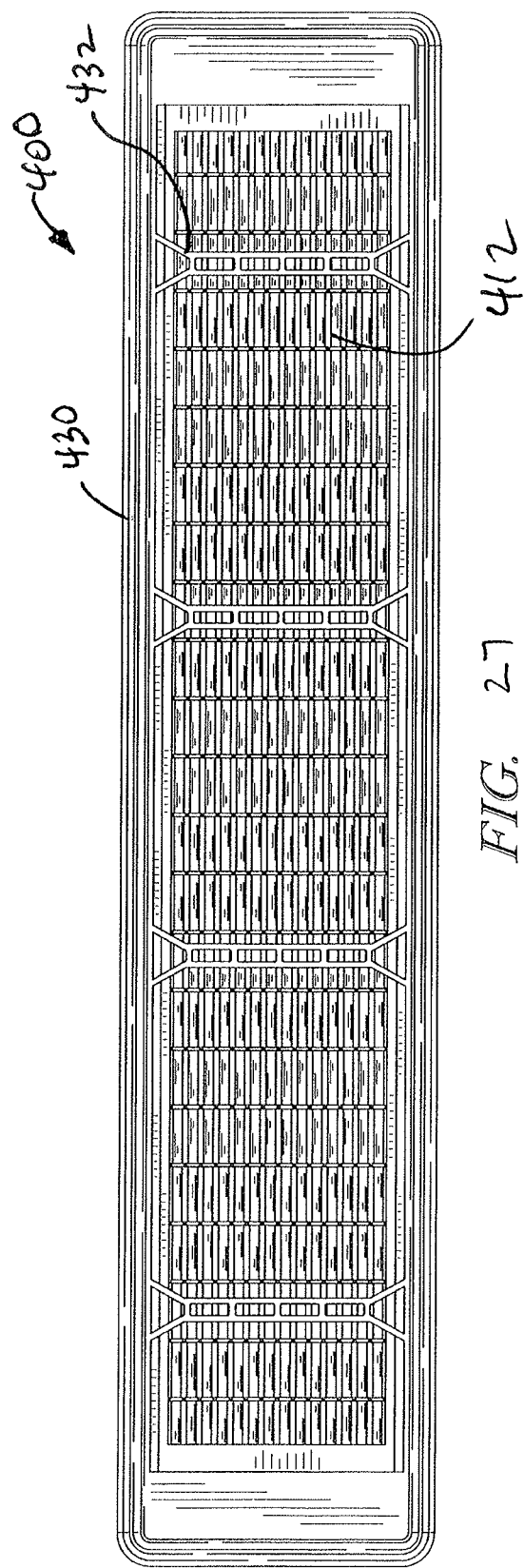
FIG. 27 is a top view of the air filter of FIG. 22.
Figure 28:
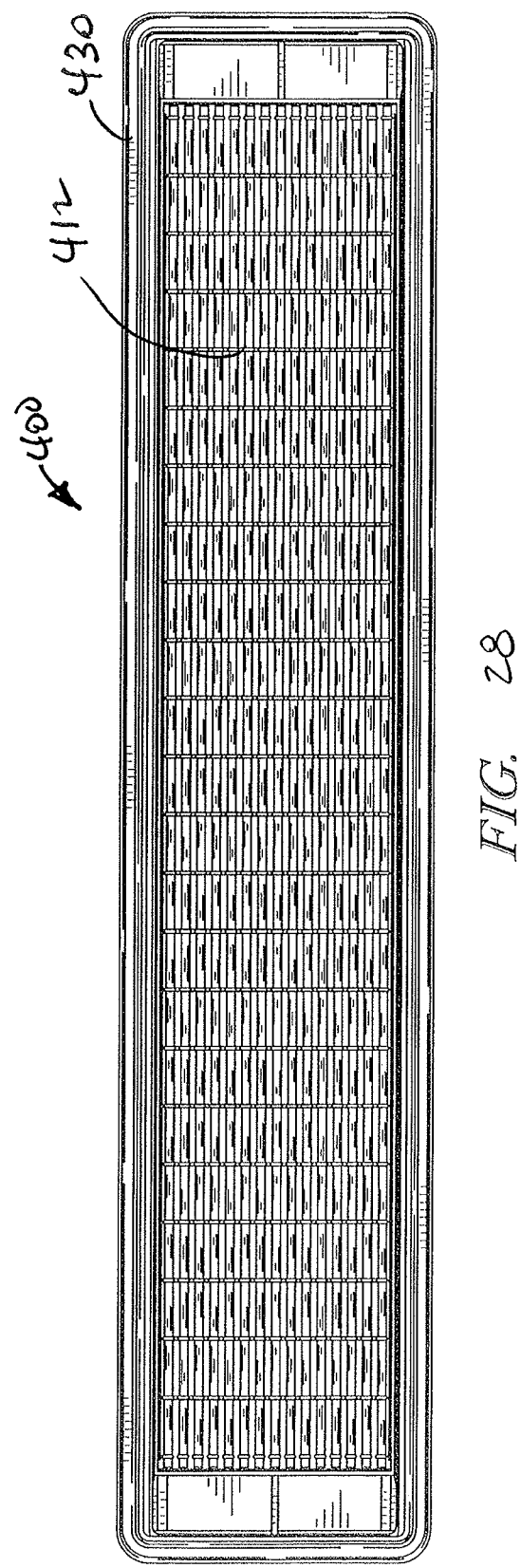
FIG. 28 is a bottom view of the air filter of FIG. 22.

Flange 426 extends around the perimeter of the frame member 418 at the edge 424, as shown in FIG. 22. An elastomeric material is overmolded or adhered onto the flange 426 to form a gasket 430 around the perimeter. The dimensions of walls 420, 421, 422, 423 place flange 426 in a plane that is generally parallel to an upper flow face 428 of air filter 400. Gasket 430 is adapted to be used for axial compression within a two-part air filter housing. Frame member 418 includes a series of structural braces 432 that extend across the top opening of the frame member 418. Structural braces 432 are interconnected to the side walls 420, 421, 422, 423 and provide rigidity to the frame member 418. While one type of brace arrangement is used, it is contemplated that other brace designs could be used to provide the desired structural rigidity to the air filter 400.

The frame member 418 is secured to the filter pack 412 with an adhesive. Due to the deep draw of the filter pack 412, the filter pack 412 extends down past the bottom of the frame member 418. The bond between the frame member 418 and the filter pack 412 is achieved by a continuously dispensed adhesive bead on the interior surfaces of the side walls 420, 421, 422, 423 of the frame member 418. The interior surfaces of the frame member 418 lie within individual planes, one of which is perpendicular to the remaining two, which are parallel. The adhesive used to secure the filter pack 412 to the frame member 418 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 430 extends around the perimeter of frame member 418 and is the mechanism that forms an airtight seal between the air filter 400 and the air cleaner housing in which the air filter 400 is contained during use. Gasket 430 is overmolded directly to the frame member 418 with no additional materials needed to maintain adhesion between the two elements. Alternatively, gasket 430 is bonded to the frame member 418 using a continuous bead of adhesive. Gasket 430 can be designed to provide either a radially directed seal to the air cleaner housing or can be designed to form a pinch type seal between surfaces in the air cleaner housing.

Another embodiment of an air filter 500 is oval in shape and is designed to be positioned within an air filter housing (not shown). Air filter 500 includes an upper frame member 518 and a lower frame member 519, as shown in FIGS. 29-35. In some embodiments, upper and lower frame members 518, 519 are made using an injection molding process. Frame members 518, 519 include side walls 520, 522 that extend around the perimeter of the frame members 518, 519. Upper frame member 518 includes a top wall 523 formed to include an opening 525 to allow for the passage of air. Lower frame member 519 includes a bottom wall 527 formed to include an opening 529 to allow for the passage of air. A lower edge 524 of side wall 522 includes an outwardly extending flange 526. Side walls 520, 522 are of uniform height around the perimeter of the air filter 500.

Figure 29:
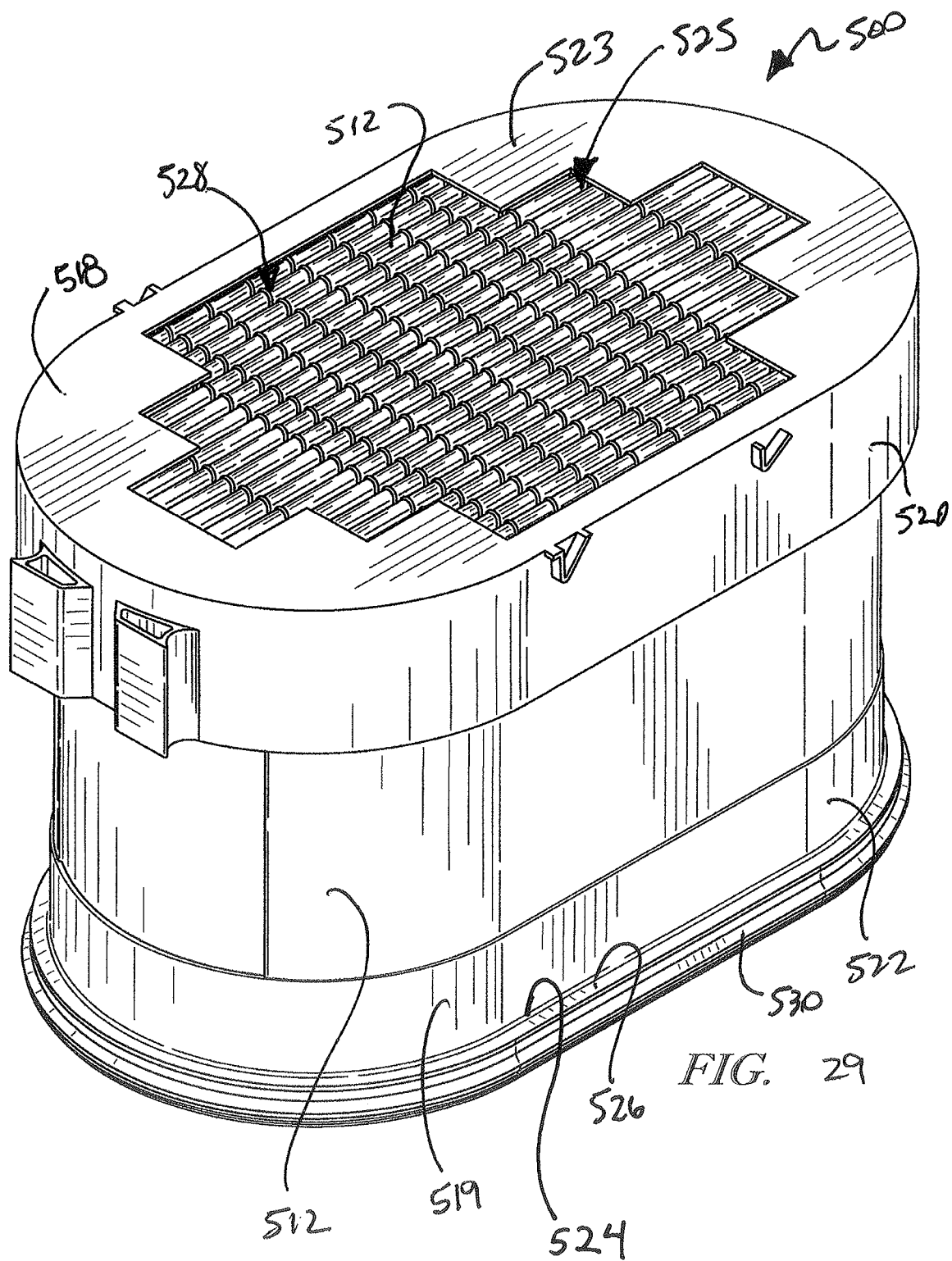
FIG. 29 is a perspective view of a fifth embodiment of an air filter showing a frame member, a deep-pleated filter pack, a portion of which is positioned within the frame member, and a gasket extending around the perimeter of the frame member, the pleat pack formed from a series of vertical pleats.
Figure 30:
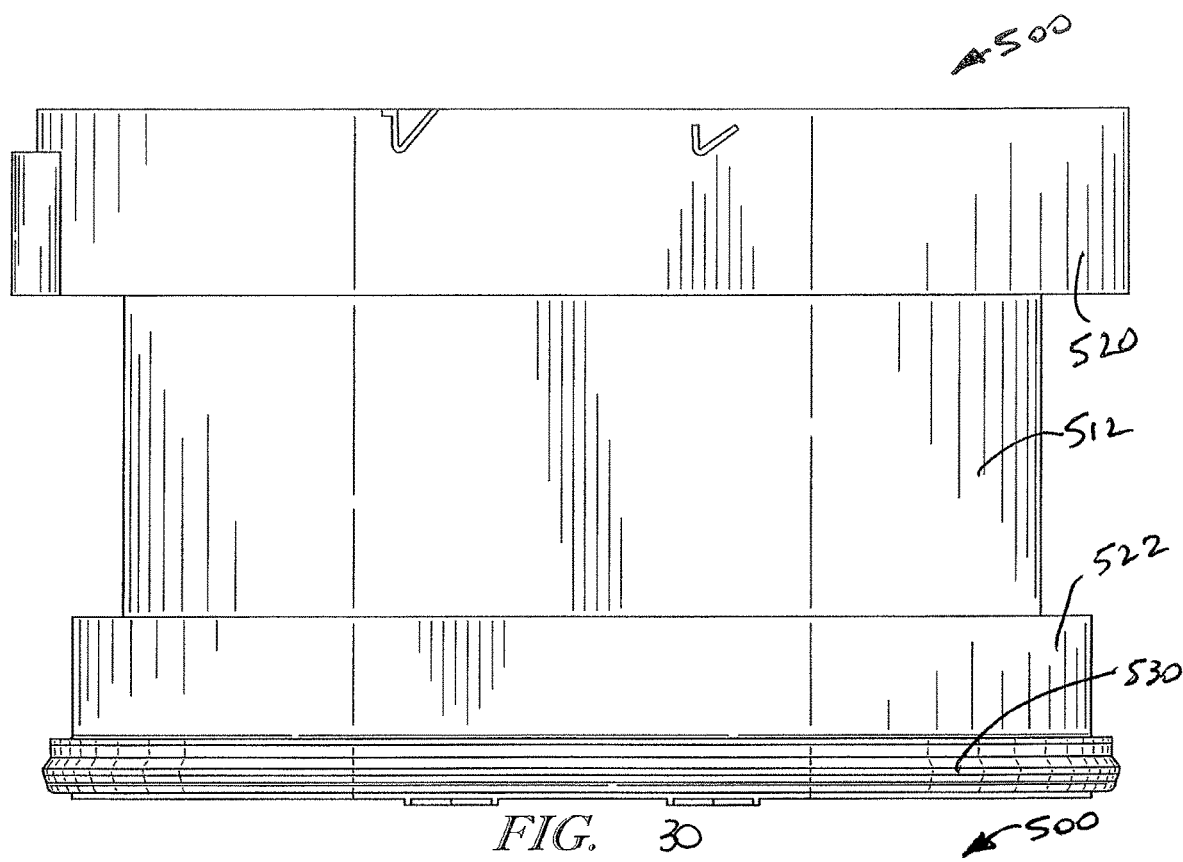
FIG. 30 is a side view of the air filter of FIG. 29.
Figure 31:
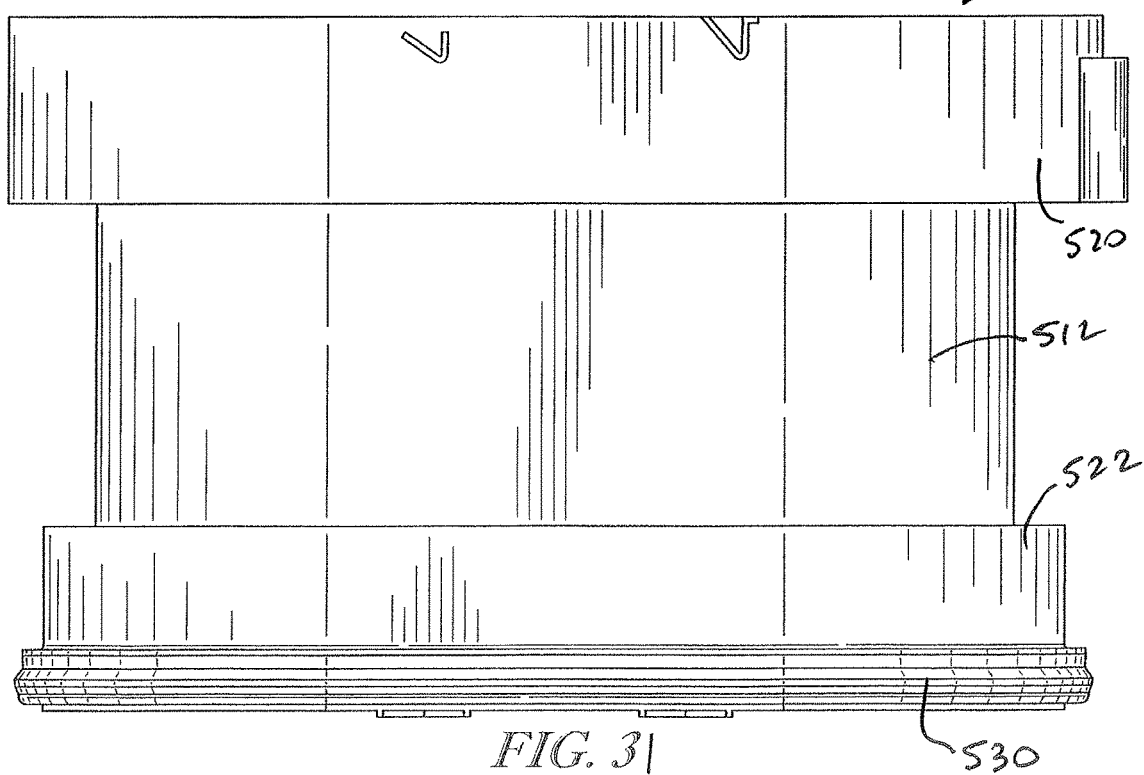
FIG. 31 is another side view of the air filter of FIG. 29.
Figure 32:
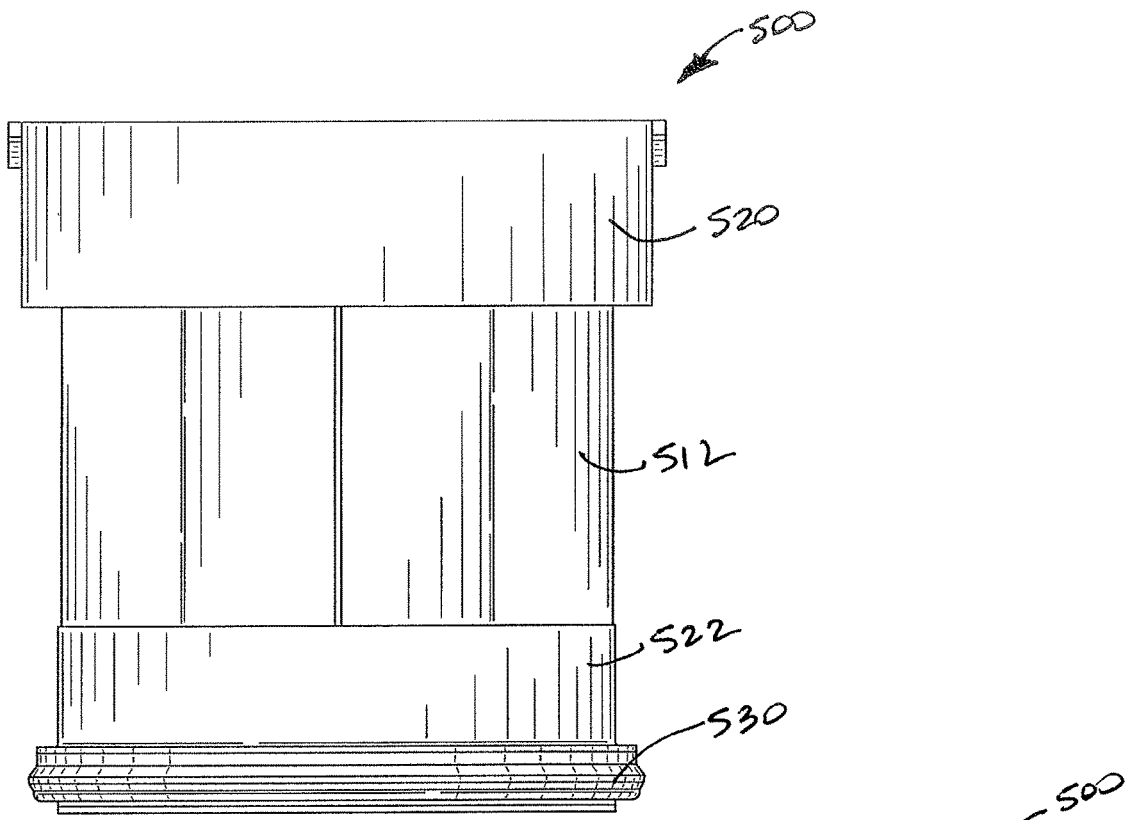
FIG. 32 is a front view of the air filter of FIG. 29.
Figure 33:
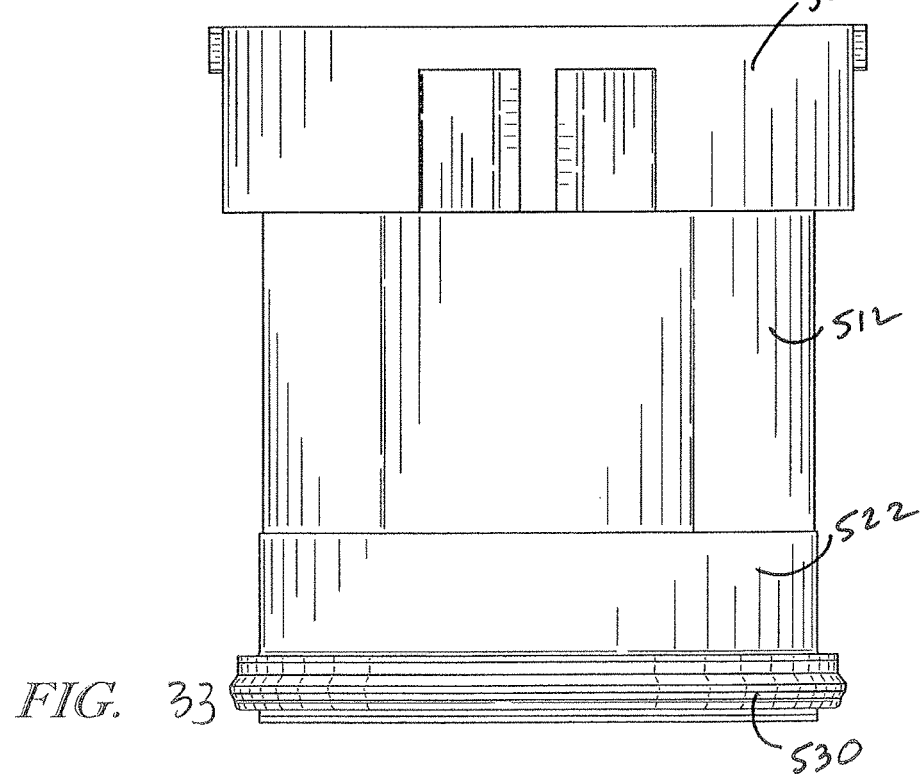
FIG. 33 is a rear view of the air filter of FIG. 29.
Figure 34:
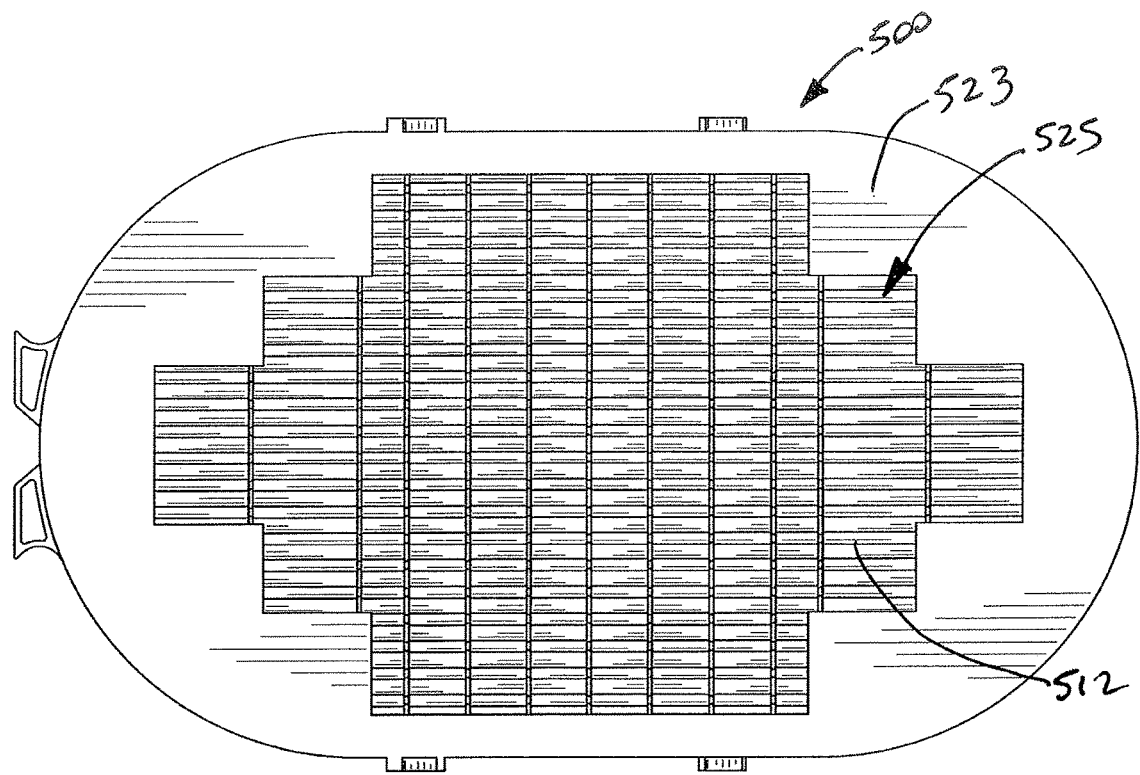
FIG. 34 is a top view of the air filter of FIG. 29.
Figure 35:
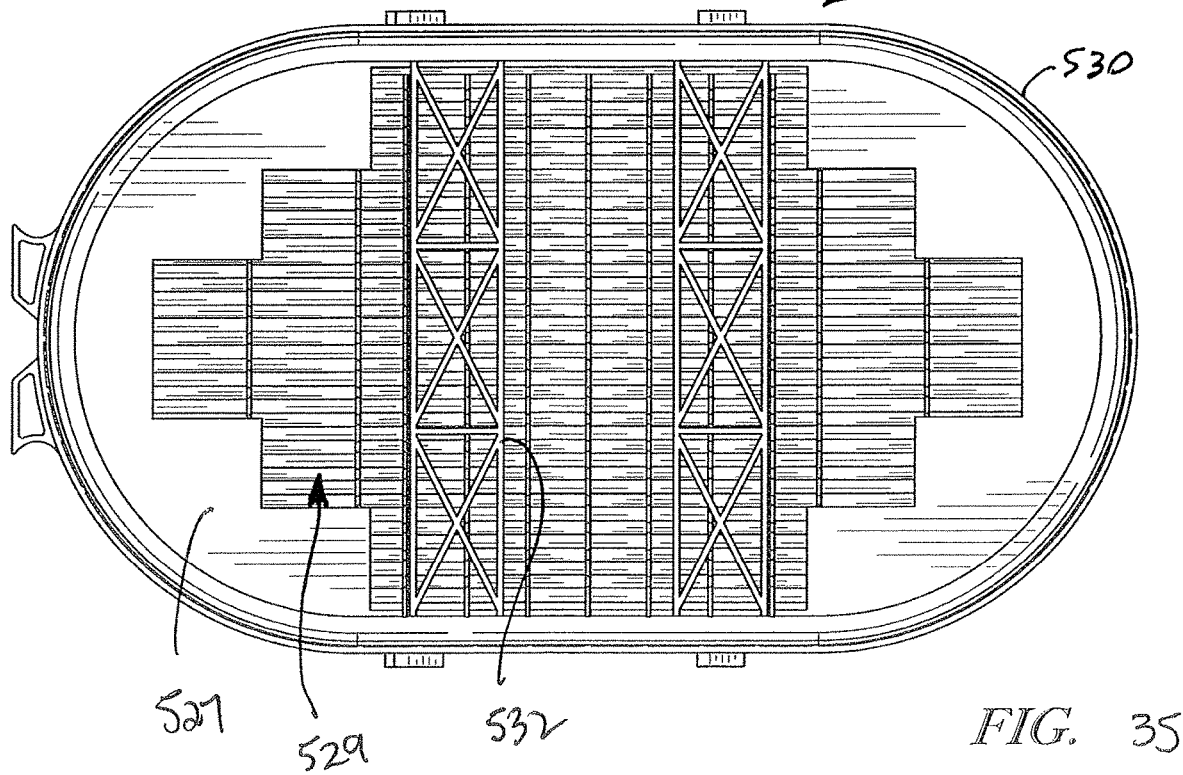
FIG. 35 is a bottom view of the air filter of FIG. 29.

Flange 526 extends around the perimeter of the lower frame member 519 at the lower edge 524, as shown in FIG. 29. An elastomeric material is overmolded or adhered adjacent the flange 526 to form a gasket 530 around the perimeter. The dimensions of side wall 522 place flange 526 in a plane that is parallel to an upper flow face 528 of air filter 500. Gasket 530 is adapted to be used for radial compression within a two-part air filter housing. Frame member 519 includes a series of structural braces 532 that extend across the opening 529, as shown in FIG. 35. Structural braces 532 are interconnected to the side wall 522 and provide rigidity to the frame member 519. While one type of brace arrangement is used, it is contemplated that other brace designs could be used to provide the desired structural rigidity to the air filter 500.

The frame members 518, 519 are secured to the filter pack 512 with an adhesive. Filter pack 512 extends between frame members 518, 519. The bond between the frame members 518, 519 and the filter pack 512 is achieved by a continuously dispensed adhesive bead on the interior surfaces of the side walls 520, 522 of the frame members 518, 519. The adhesive used to secure the filter pack 512 to the frame members 518, 519 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 530 extends around the perimeter of frame member 519 and is the mechanism that forms an airtight seal between the air filter 500 and the air cleaner housing in which the air filter 500 is contained during use. Gasket 530 is overmolded directly to the frame member 519 with no additional materials needed to maintain adhesion between the two elements. Alternatively, gasket 530 is bonded to the frame member 519 using a continuous bead of adhesive. Gasket 530 can be designed to provide either a radially directed seal to the air cleaner housing or can be designed to form a pinch type seal between surfaces in the air cleaner housing. Filter pack 512 of air filter 500 is trimmed during production to form the overall oval shape. It is also possible to trim the filter material during production of the filter pack 512 so that it is generally round in shape.

Another embodiment of an air filter 600 is oval in shape and is designed to be positioned within an air filter housing (not shown). Air filter 600 includes an upper frame member 618 and a lower frame member 619, as shown in FIGS. 38-41. In some embodiments, upper and lower frame members 618, 619 are made using an injection molding process. Frame members 618, 619 include side walls 620, 622 that extend around the perimeter of the frame members 618, 619. Upper frame member 618 includes a top wall 623 formed to include an opening 625 to allow for the passage of air. Lower frame member 619 includes a bottom wall (not shown) formed to include an opening (not shown) to allow for the passage of air. A lower edge 624 of side wall 622 includes an outwardly extending flange 626. Side walls 620, 622 are of uniform height around the perimeter of the air filter 600.

Figure 38:
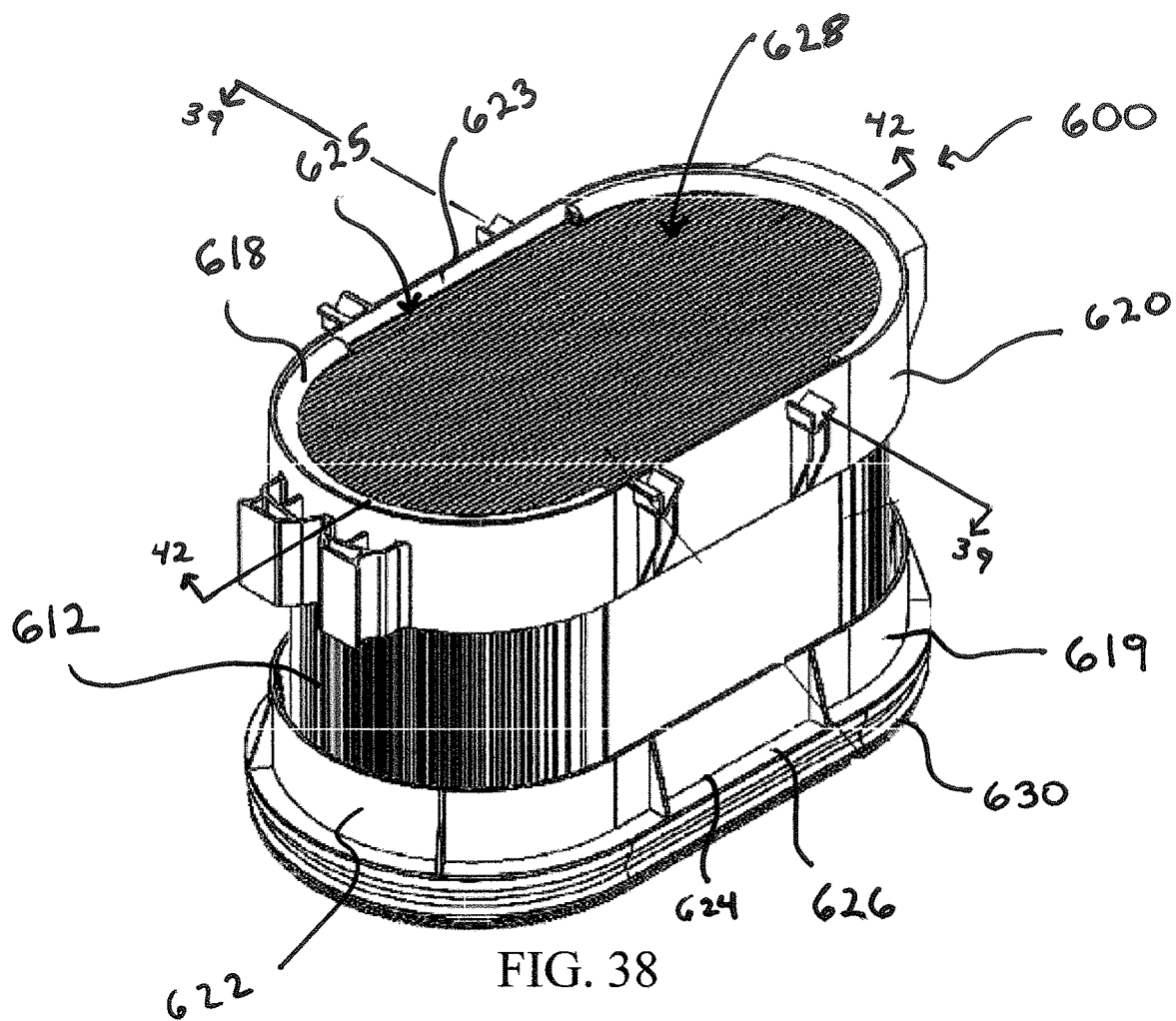
FIG. 38 is a perspective view of a sixth embodiment of an air filter showing a frame member, a deep-pleated filter pack, a portion of which is positioned within the frame member, and a gasket extending around the perimeter of the frame member, the pleat pack formed from a series of vertical pleats.

Flange 626 extends around the perimeter of the lower frame member 619 at the lower edge 624, as shown in FIG. 38. An elastomeric material may be overmolded or adhered adjacent the flange 626 to form a gasket 630 around the perimeter. The dimensions of side wall 622 place flange 626 in a plane that is parallel to an upper flow face 628 of air filter 600. Gasket 630 is adapted to be used for radial compression within a two-part air filter housing.

The frame members 618, 619 are secured to the filter pack 612 with an adhesive. Filter pack 612 extends between frame members 618, 619. The bond between the frame members 618, 619 and the filter pack 612 is achieved by a continuously dispensed adhesive bead on the interior surfaces of the side walls 620, 622 of the frame members 618, 619. The adhesive used to secure the filter pack 612 to the frame members 618, 619 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 630 extends around the perimeter of frame member 619 and is the mechanism that forms an airtight seal between the air filter 600 and the air cleaner housing in which the air filter 600 is contained during use. Gasket 630 is overmolded directly to the frame member 619 with no additional materials needed to maintain adhesion between the two elements. Alternatively, gasket 630 is bonded to the frame member 619 using a continuous bead of adhesive. Gasket 630 can be designed to provide either a radially directed seal to the air cleaner housing or can be designed to form a pinch type seal between surfaces in the air cleaner housing. The edges of the filter pack 612 of the air filter 600 are trimmed during production to match the radial outer geometry of the air filter and to form an overall oval shape. It is also possible to trim the filter material during production of the filter pack 612 so that it is generally round in shape. The radial edges are airtight seamed with a continuous glue bead that follows the arc of the outer edge. The filter pack 612 contains pleat separator glue beads of a type described above.

Figure 39:
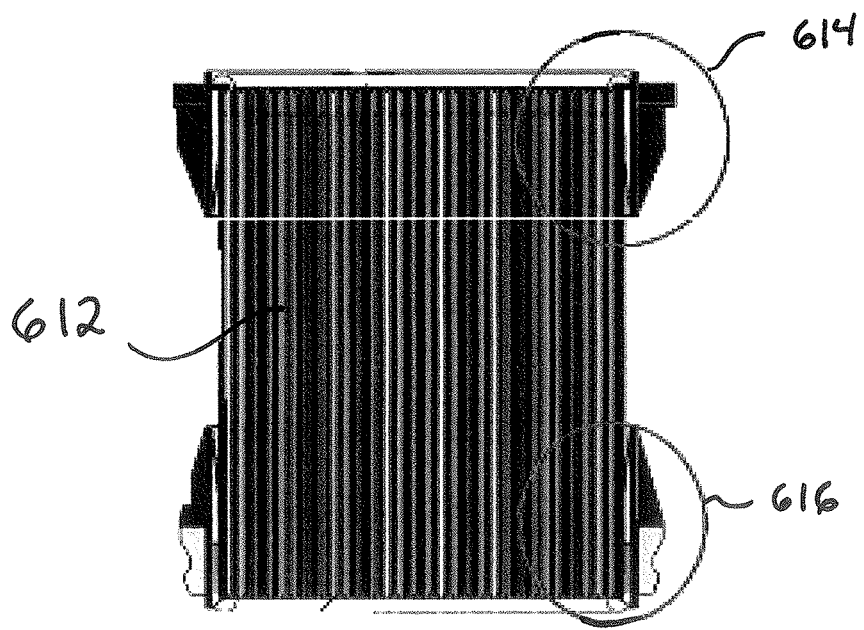
FIG. 39 is a schematic cross-sectional view of the air filter of FIG. 38 taken through the line 39-39.
Figure 40:
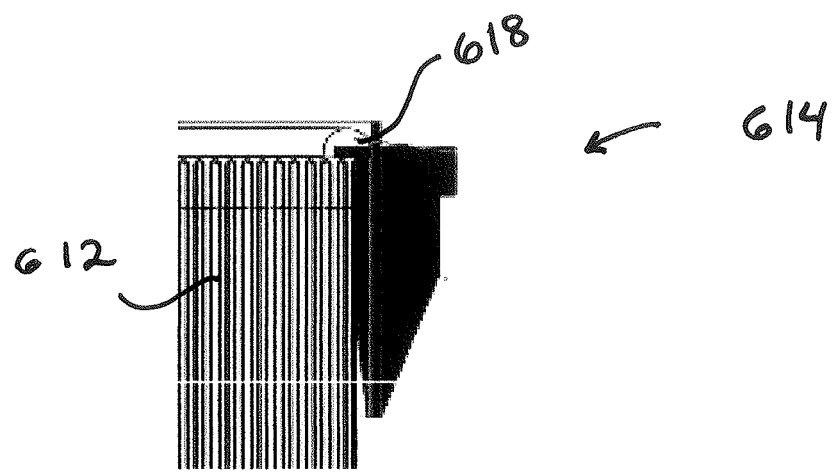
FIG. 40 is a detailed view of the upper inset region of FIG. 39.

FIG. 40 shows a detailed view of an upper inset region 614 of FIG. 39. A filter pack-to-frame adhesive 618 is provided by an adhesive bead lapped over a small projection on the interior of the plastic frame member 618 as well as the outer edge of the filter pack 612. In some embodiments, the bead only affixes the plastic frame to the pack but does not form an airtight seal.

Figure 41:
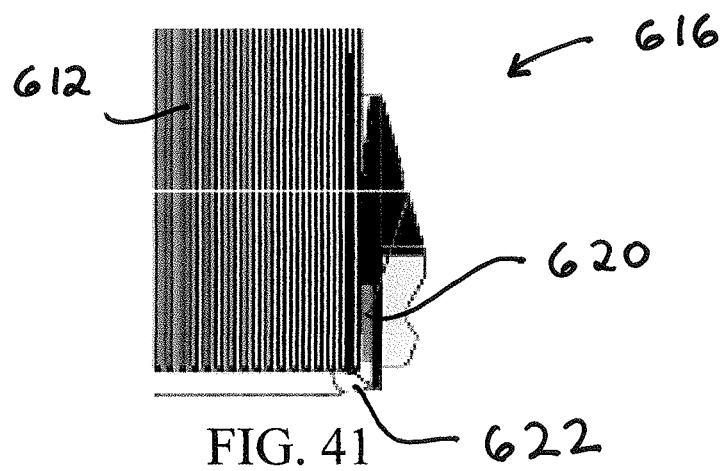
FIG. 41 is a detailed view of the lower inset region of FIG. 39.
Figure 42:
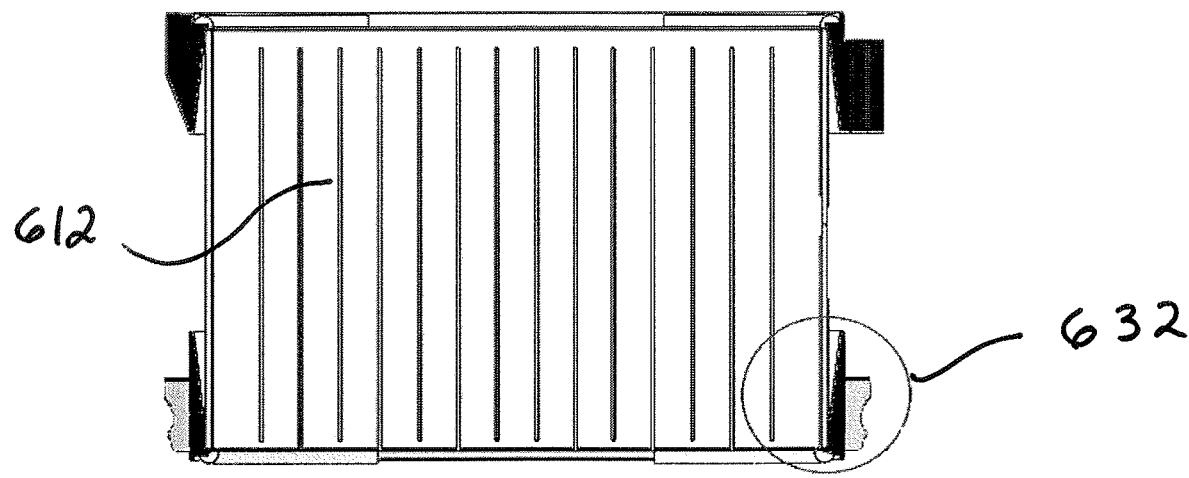
FIG. 42 is a schematic cross-sectional view of the air filter of FIG. 38 taken through the line 42-42.
Figure 43:
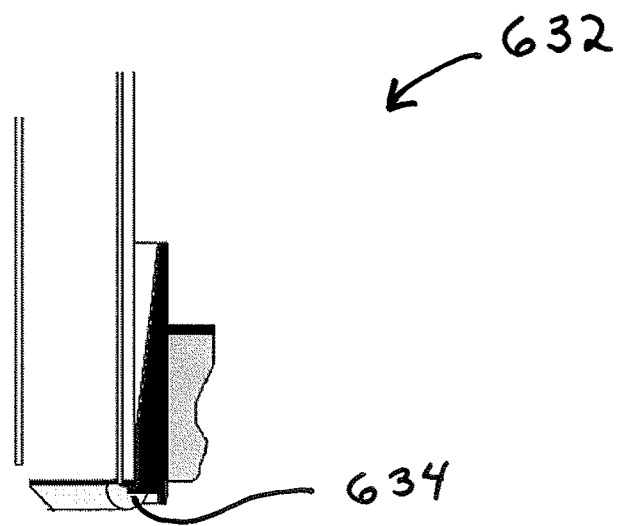
FIG. 43 is a detailed view of the lower inset region of FIG. 42.

FIG. 41 shows a detailed view of a lower inset region 616 of FIG. 39. An interior adhesive dam 620 containing an adhesive-backed soft gasket material is bonded directly to the side of the filter pack 612. The dam 620 is recessed approximately ¼ inch below the top face of the filter pack. A trough is created in which the pack-to-frame adhesive can be dispensed. In such a way, a physical barrier to hold the pack-to-frame adhesive within a given location during the curing process is provided. The pack-to-frame adhesive 622 shown in FIG. 41 is provided on each edge side of the filter pack 612. FIG. 43 shows a detailed view of a lower inset region 632 of FIG. 42. The adhesive bead 634 is lapped over a small projection on the interior of the plastic frame as well as the filter pack edge seam glue bead as shown in FIG. 43.

Another embodiment of an air filter 700 is circular in shape and is designed to be positioned within an air filter housing (not shown). Air filter 700 includes an upper frame member 718 and a lower frame member 719, as shown in FIGS. 42-45. In some embodiments, upper and lower frame members 718, 719 are made using an injection molding process. Frame members 718, 719 include side walls 720, 722 that extend around the perimeter of the frame members 718, 719. Upper frame member 718 includes a top wall 723 formed to include an opening 725 to allow for the passage of air, a plurality of screws 721 configured to affix the air filter 700 to an air cleaner housing (not shown). Lower frame member 719 includes a bottom wall (not shown) formed to include an opening (not shown) to allow for the passage of air. A lower edge 724 of side wall 722 includes an outwardly extending flange 726. Side walls 720, 722 are of uniform height around the perimeter of the air filter 700.

Figure 44:
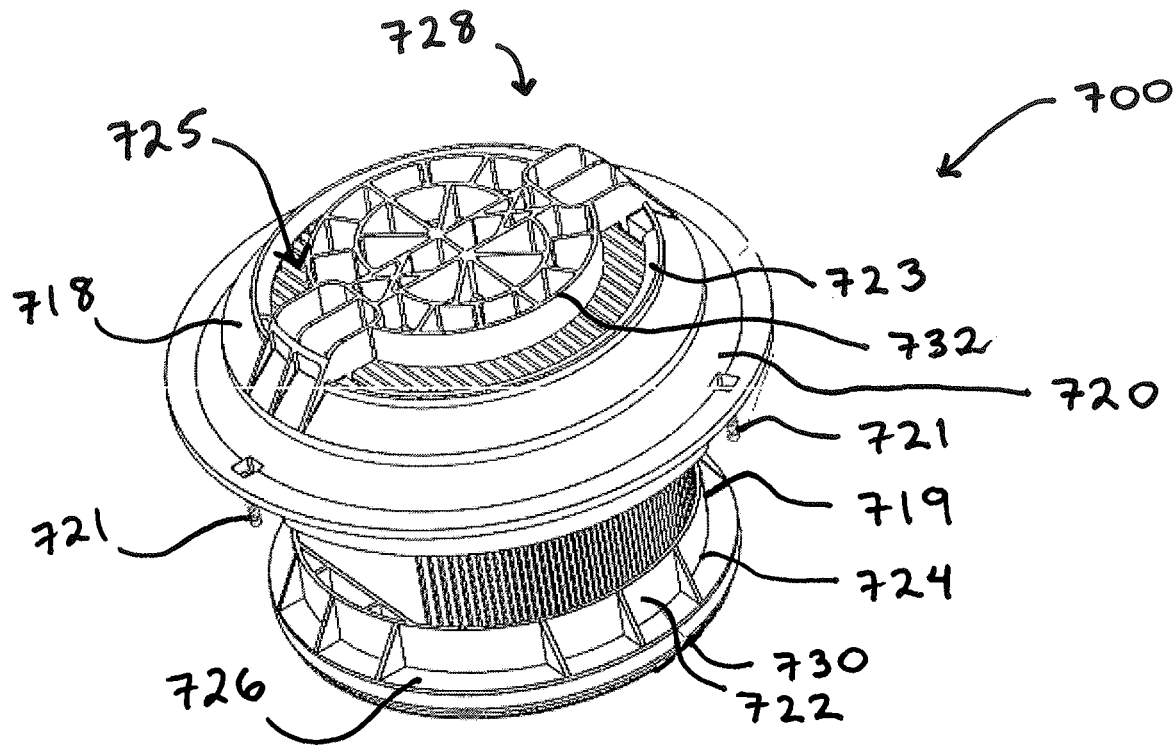
FIG. 44 is a perspective view of a seventh embodiment of an air filter showing a frame member, a deep-pleated filter pack, a portion of which is positioned within the frame member, and a gasket extending around the perimeter of the frame member, the pleat pack formed from a series of vertical pleats.

Flange 726 extends around the perimeter of the lower frame member 719 at the lower edge 724, as shown in FIG. 44. In some embodiments, an elastomeric material is overmolded adjacent the flange 726 to form a gasket 730 around the perimeter. In other embodiments, the gasket 730 is bonded to the plastic lower frame member 719 with an adhesive. The gasket 730 forms an airtight seal against an interior wall of the air cleaner housing (not shown). The dimensions of side wall 722 place flange 726 in a plane that is parallel to an upper flow face 728 of air filter 700. Gasket 730 is adapted to be used for radial compression within a two-part air filter housing. Upper frame member 718 includes a series of structural braces 732 that extend across the opening 725 of the upper frame member 718, as shown in FIG. 44. Structural braces 732 are interconnected to the side wall 720 and provide rigidity to the frame members 718. While one type of brace arrangement is used, it is contemplated that other brace designs could be used to provide the desired structural rigidity to the air filter 700.

The frame members 718, 719 are secured to the filter pack 712 with an adhesive. Filter pack 712 extends between frame members 718, 719. The bond between the frame members 718, 719 and the filter pack 712 is achieved by a continuously dispensed adhesive bead on the interior surfaces of the side walls 720, 722 of the frame members 718, 719. The adhesive used to secure the filter pack 712 to the frame members 718, 719 may contain hot melt adhesive, UV cured adhesive, moisture-cured adhesive, multi-component reactive cured adhesive (e.g., two-part epoxy adhesive, two-part acrylic adhesive, two-part urethane adhesive), or a combination thereof.

Gasket 730 extends around the perimeter of frame member 719 and is the mechanism that forms an airtight seal between the air filter 700 and the air cleaner housing in which the air filter 700 is contained during use. Gasket 730 is overmolded directly to the frame member 719 with no additional materials needed to maintain adhesion between the two elements. Alternatively, gasket 730 is directly glued to the plastic frame 719. Gasket 730 can be designed to provide either a radially directed seal to the air cleaner housing or can be designed to form a pinch type seal between surfaces in the air cleaner housing. The edges of the filter pack 712 of the air filter 700 are trimmed during production to match the radial outer geometry of the upper and lower frame members 718, 719 of air filter 700 and to form an overall circular shape. It is also possible to trim the filter material during production of the filter pack 712 so that it is oval in shape. The radial edges are airtight seamed with a continuous glue bead that follows the arc of the outer edge. The filter pack 712 contains pleat separator glue beads of a type described above.

Figure 45:
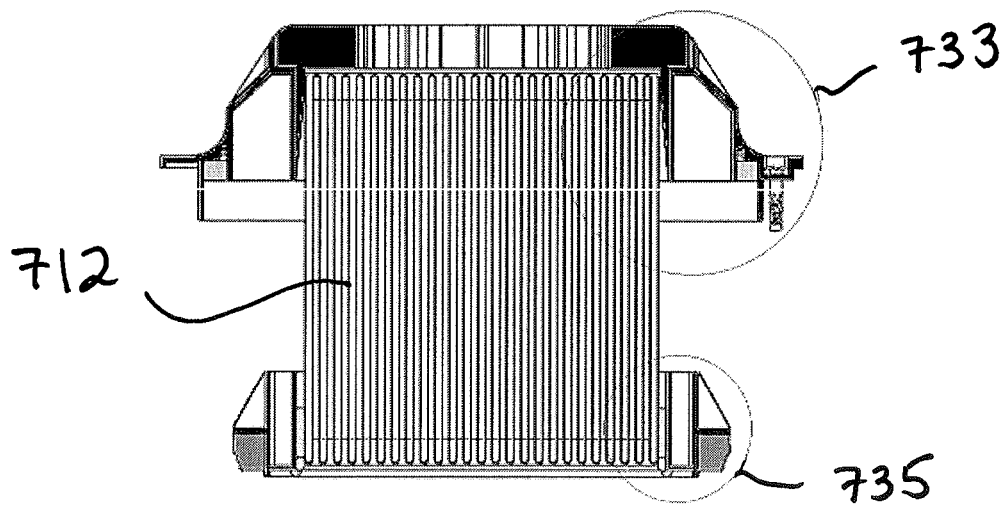
FIG. 45 is a schematic cross-sectional view of the air filter of FIG. 44.
Figure 46:
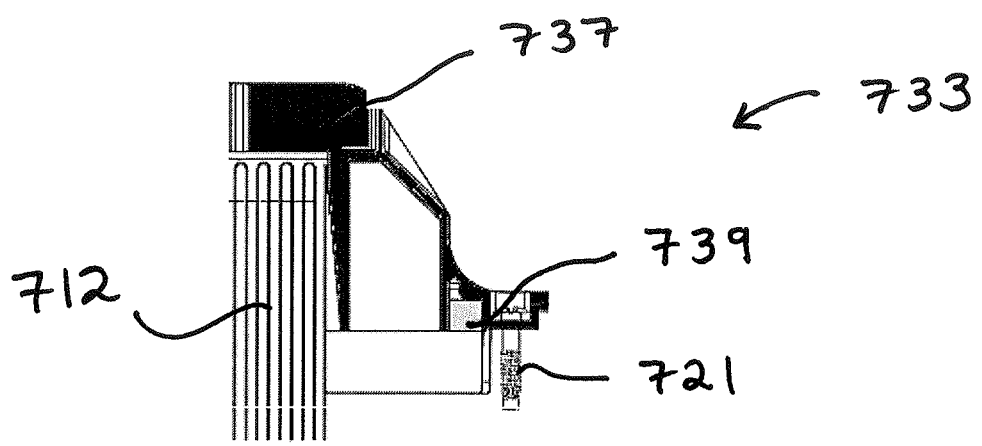
FIG. 46 is a detailed view of the upper inset region of FIG. 45.

FIG. 46 shows a detailed view of the upper inset region 733 of FIG. 45. A portion 737 of the upper frame member 718 of air filter 700 is bonded to the filter pack 712 with a glue bead (not shown). In some embodiments, the adhesive bond between these two elements is not airtight. An interior gasket 739 is glued into a receiver trough in the upper frame member 718. The purpose of the gasket is to provide a soft contacting surface for the outer rim of the air cleaner housing when the filter pack is installed.

Figure 47:
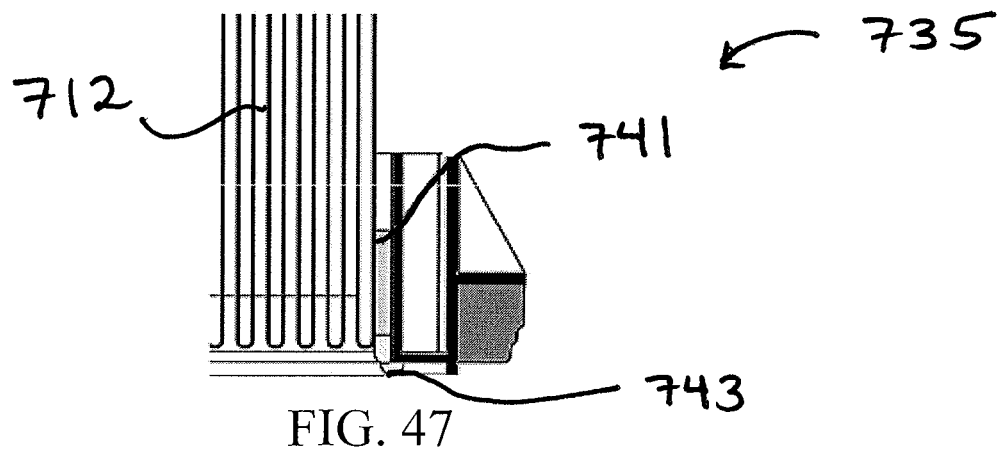
FIG. 47 is a detailed view of the lower inset region of FIG. 45.

FIG. 47 shows a detailed view of the lower inset region 735 of FIG. 45. An adhesive dam 741 containing a soft, adhesive-backed gasket material is bonded directly to the side of the filter pack 712. The trough provides a physical barrier to hold the pack-to-frame adhesive within a given location during the curing process. A filter pack-to-frame adhesive 743 shown in FIG. 47 is provided as a continuous bead of adhesive around the full perimeter of the filter pack 712, such that an airtight seal is formed between these two elements.

Figure 48:
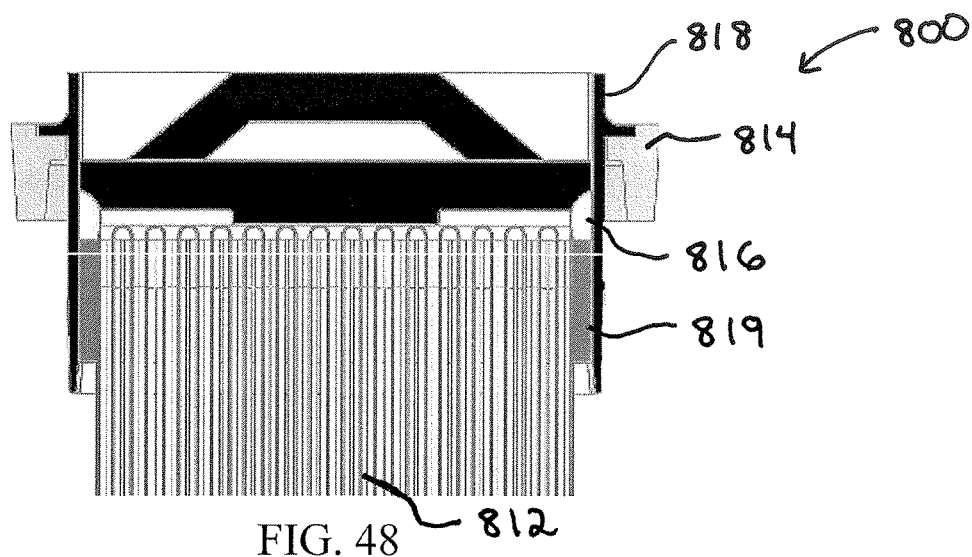
FIG. 48 is a schematic cross-sectional view of an eighth embodiment of an air filter showing a frame member, a deep-pleated filter pack, a portion of which is positioned within the frame member, and a gasket extending around the perimeter of the frame member, the pleat pack formed from a series of vertical pleats.

FIG. 48 is a schematic cross-sectional view of an eighth embodiment of an air filter 800 showing a frame member 818, a deep-pleated filter pack 812, a portion of which is positioned within the frame member 818, and a primary sealing gasket 814 that extends around the perimeter of the frame member 818. In some embodiments, as described above, a sealing gasket may be overmolded to the plastic frame. In other embodiments, as shown in FIG. 48, the sealing gasket 814 is bonded to the plastic frame member 818 with a continuous bead of adhesive. The sealing gasket 814 contains a polyisoprene elastomer.

As shown in FIG. 48, a pack-to-frame adhesive 816 is used to bond the filter pack 812 to the frame member 818. The air filter 800 further includes an interior adhesive dam 819 analogous to the interior adhesive dam 620 shown in FIG. 21. The interior adhesive dam 819 contains an adhesive-backed soft gasket material that is bonded directly to the side of the filter pack 812. The dam 819 is recessed approximately ¼ inch below the top face of the filter pack 812. A trough is created in which the pack-to-frame adhesive can be dispensed. In such a way, a physical barrier to hold the pack-to-frame adhesive within a given location during the curing process is provided. The pack-to-frame adhesive shown in FIG. 48 is provided on the first and last pleat face edges of the filter pack 812.

Figure 49:
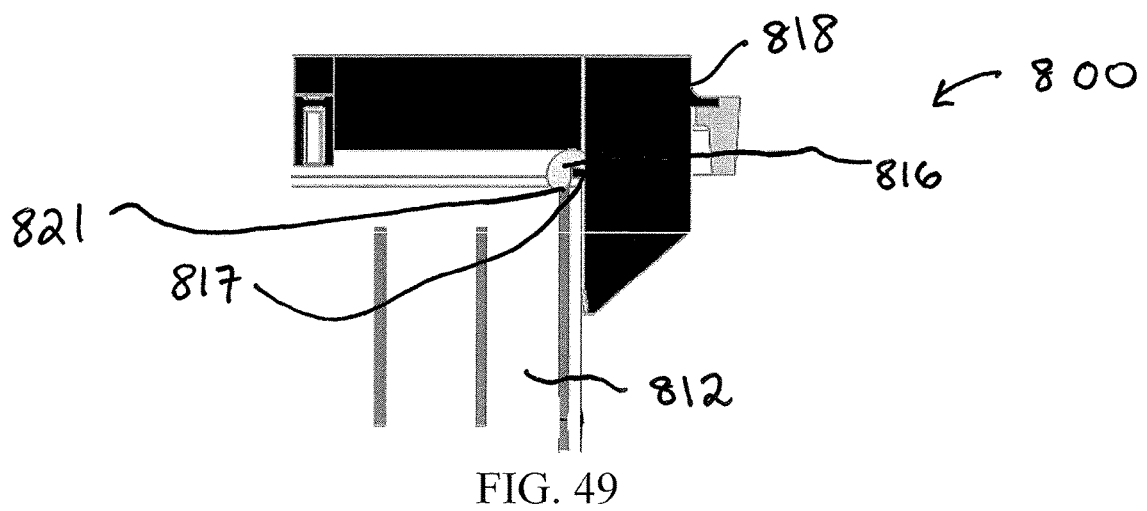
FIG. 49 is a schematic, partial cross-sectional view perpendicular to the view shown in FIG. 48 of the eight embodiment of the air filter, showing a frame member and a deep-pleated filter pack, a portion of which is positioned within the frame member.

FIG. 49 is a schematic cross-sectional view perpendicular to the view shown in FIG. 48 of the eighth embodiment of an air filter 800 showing a frame member 818 and a deep-pleated filter pack 812, a portion of which is positioned within the frame member 818. As shown in FIG. 49, an adhesive bead 816 is lapped over a small projection 817 on the interior of the plastic frame 818 as well as the filter pack 812 edge seam glue bead 821. This configuration affixes the filter pack 812 to the frame member 818 and also creates an airtight seal between the plastic frame member 818 and the pack edge seam glue bead.

It is to be understood that use of the indefinite articles "a" and "an" in reference to an element (e.g., "a pleat," "a pleat separator," etc.) does not exclude the presence, in some embodiments, of a plurality of such elements.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. An air filter configured for placement in an air filter housing, the air filter comprising:
   a frame member;
   a filter medium wherein at least a portion of the filter medium is positioned within the frame member, the filter medium comprising a plurality of pleats and a plurality of pleat separators;
   wherein each of the plurality of pleat separators is configured to maintain a space between opposing faces of adjacent pleats, the space being configured to accommodate airflow through the filter medium;

wherein the filter medium comprises an upper flow face comprising a plurality of ridge fold edges and an opposing lower flow face comprising a plurality of furrow fold edges, the ridge fold edges and the furrow fold edges alternating throughout the filter medium;

wherein each of the plurality of pleat separators is formed from an adhesive material;

wherein a ratio of (a) pleat depth as measured from the ridge fold edges to the furrow fold edges to (b) pleat spacing as measured from a first pleat face to an adjacent pleat face is at least about 25;

a sealing member extending around a perimeter of the frame member;

wherein the frame member comprises an upper frame member and a lower frame member, wherein each of the upper frame member and the lower frame member comprises a side wall that extends around a perimeter thereof; and wherein the upper frame member further comprises a top wall defining a first opening, wherein the lower frame member further comprises a bottom wall defining a second opening, wherein the bottom wall of the lower frame member comprises an outwardly extending flange, and wherein the sealing member is overmolded adjacent the flange to form a gasket around the perimeter.

2. An air filter configured for placement in an air filter housing, the air filter comprising:

a frame member formed from a molded plastic material;

a filter medium wherein at least a portion of the filter medium is positioned within the frame member, the filter medium comprising a plurality of pleats and a plurality of pleat separators;

wherein each of the plurality of pleat separators is configured to maintain a space between opposing faces of adjacent pleats, the space being configured to accommodate airflow through the filter medium;

wherein the filter medium comprises an upper flow face comprising a plurality of ridge fold edges and an opposing lower flow face comprising a plurality of furrow fold edges, the ridge fold edges and the furrow fold edges alternating throughout the filter medium;

wherein each of the plurality of pleat separators is formed from an adhesive material;

wherein a ratio of (a) pleat depth as measured from the ridge fold edges to the furrow fold edges to (b) pleat spacing as measured from a first pleat face to an adjacent pleat face is at least about 25; and a sealing member extending around a perimeter of the frame member wherein the sealing member is attached to the frame member with an adhesive.

3. The air filter of claim 2 wherein each of the plurality of pleat separators runs in a direction substantially parallel to a height dimension of the pleats.

4. The air filter of claim 2 wherein the adjacent pleats are substantially parallel to one another.

5. The air filter of claim 2 wherein a first outer edge of the filter medium and an opposite second outer edge of the filter medium each comprises a substantially continuous bead of the adhesive material, such that the first outer edge and the opposite second outer edge are substantially sealed by the adhesive material.

6. The air filter of claim 5 wherein each of the plurality of pleat separators positioned between the first outer edge of the filter medium and the opposite second outer edge of the filter medium comprises a substantially continuous bead of the adhesive material.

7. The air filter of claim 5 wherein one or more of the plurality of pleat separators positioned between the first outer edge of the filter medium and the opposite second outer edge of the filter medium comprises a plurality of non-continuous interrupted beads of the adhesive material.

8. An air filter configured for placement in an air filter housing, the air filter comprising:

a frame member having a side wall and a flange extending away from the side wall;

a filter medium wherein at least a portion of the filter medium is positioned within the frame member, the filter medium comprising a plurality of pleats and a plurality of pleat separators;

wherein each of the plurality of pleat separators is configured to maintain a space between opposing faces of adjacent pleats, the space being configured to accommodate airflow through the filter medium;

wherein the filter medium comprises an upper flow face comprising a plurality of ridge fold edges and an opposing lower flow face comprising a plurality of furrow fold edges, the ridge fold edges and the furrow fold edges alternating throughout the filter medium;

wherein each of the plurality of pleat separators is formed from an adhesive material;

wherein a ratio of (a) pleat depth as measured from the ridge fold edges to the furrow fold edges to (b) pleat spacing as measured from a first pleat face to an adjacent pleat face is at least about 25; and a sealing member overmolded onto the frame member.

9. The air filter of claim 8 wherein each of the plurality of pleat separators runs in a direction substantially parallel to a height dimension of the pleats.

10. The air filter of claim 8 wherein the adjacent pleats are substantially parallel to one another.

11. The air filter of claim 8 wherein a first outer edge of the filter medium and an opposite second outer edge of the filter medium each comprises a substantially continuous bead of the adhesive material, such that the first outer edge and the opposite second outer edge are substantially sealed by the adhesive material.

12. The air filter of claim 11 wherein each of the plurality of pleat separators positioned between the first outer edge of the filter medium and the opposite second outer edge of the filter medium comprises a substantially continuous bead of the adhesive material.

13. The air filter of claim 11 wherein one or more of the plurality of pleat separators positioned between the first outer edge of the filter medium and the opposite second outer edge of the filter medium comprises a plurality of non-continuous interrupted beads of the adhesive material.

14. The air filter of claim 8 wherein the sealing member is a gasket comprising rubber, polyurethane, thermo-plastic or polyisoprene elastomer.

* * * * *